US012558624B2

(12) United States Patent　　(10) Patent No.:　US 12,558,624 B2

Hu et al.　　(45) Date of Patent:　Feb. 24, 2026

(54) METHOD AND APPARATUS FOR CONTROLLING VIRTUAL CHARACTER, DEVICE, AND STORAGE MEDIUM

(71) Applicant: TENCENT TECHNOLOGY (SHENZHEN) COMPANY LIMITED, Shenzhen (CN)

(72) Inventors: Xiao Hu, Shenzhen (CN); Chen Su, Shenzhen (CN); Yuwei Ding, Shenzhen (CN); Danxing Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 285 days.

(21) Appl. No.: 18/314,413

(22) Filed: May 9, 2023

(65) Prior Publication Data

US 2023/0271087 A1　　Aug. 31, 2023

Related U.S. Application Data

(63) Continuation of application No. PCT/CN2022/098732, filed on Jun. 14, 2022.

(30) Foreign Application Priority Data

Jul. 16, 2021　　(CN) .......................... 202110809027.5

(51) Int. Cl.
　　*A63F 13/22*　　　(2014.01)
　　*A63F 13/2145*　　(2014.01)
　　　　　(Continued)

(52) U.S. Cl.
　　CPC .......... *A63F 13/56* (2014.09); *A63F 13/2145* (2014.09); *A63F 13/22* (2014.09); *A63F 13/533* (2014.09); *A63F 13/69* (2014.09)

(58) Field of Classification Search
None
See application file for complete search history.

(56) References Cited

FOREIGN PATENT DOCUMENTS

| CN | 109589605 A | 4/2019 |
|---|---|---|
| CN | 111388998 A | 7/2020 |

(Continued)

OTHER PUBLICATIONS

YouTube video "COD Vs PUBG Vs Rules of Survival Vs Knives Out Vs F.F Max Vs Creative Destruction | Comparison"—https://www.youtube.com/watch?v=oBZtatp-inc - You Mashub, Jun. 27, 2021 (Year: 2021).*

(Continued)

*Primary Examiner* — Damon J Pierce

(74) *Attorney, Agent, or Firm* — Sughrue Mion, PLLC

(57)　　ABSTRACT

This disclosure relates to a method and apparatus for controlling a virtual character. The process of controlling the virtual character may include displaying a first virtual character and a first control group, the first control group comprising a first-type control. The process may also include switching the first control group to a second control group based on the activity of the first virtual character meeting a first condition, the second control group comprising a second-type control, wherein the first-type control is a control via which the first virtual character is triggered to release a skill, and the second-type control is a control via which the first virtual character is triggered to perform a non-combat behavior.

17 Claims, 17 Drawing Sheets

(51) Int. Cl.
    *A63F 13/533*     (2014.01)
    *A63F 13/56*     (2014.01)
    *A63F 13/69*     (2014.01)

(56)            References Cited

FOREIGN PATENT DOCUMENTS

| | | | |
|---|---|---|---|
| CN | 111589131 | A | 8/2020 |
| CN | 113521724 | A | 10/2021 |

OTHER PUBLICATIONS

YouTube video "How to Equip and Use Avatar Emotes | Roblox Tutorial"—https://www.youtube.com/watch?v=08pbYesEhbc to Bloxy News, Aug. 20, 2019 (Year: 2019).*
International Search Report for PCT/CN2022/098732, dated Aug. 25, 2022.
English Translation of the Written Opinion for PCT/CN2022/098732, dated Aug. 25, 2022.

\* cited by examiner

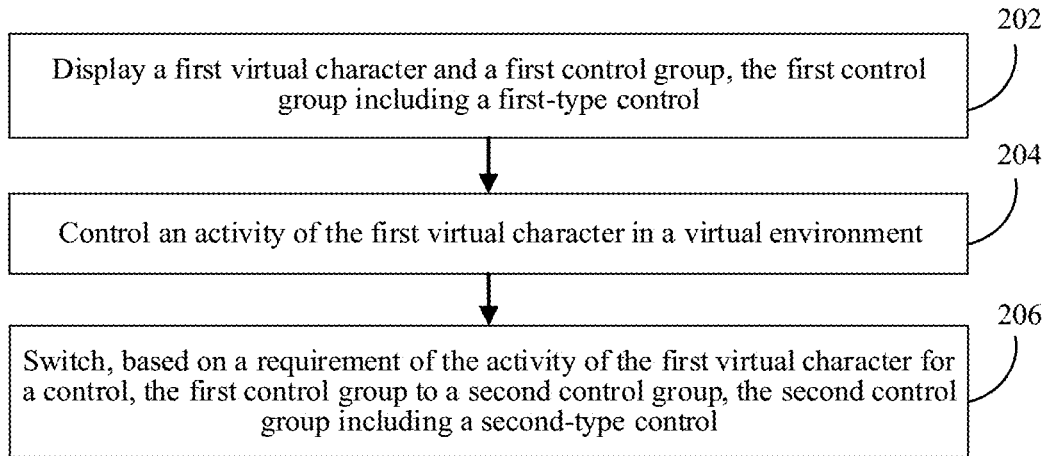

Display a first virtual character and a first control group, the first control group including a first-type control Control an activity of the first virtual character in a virtual environment Switch, based on a requirement of the activity of the first virtual character for a control, the first control group to a second control group, the second control group including a second-type control

FIG. 2

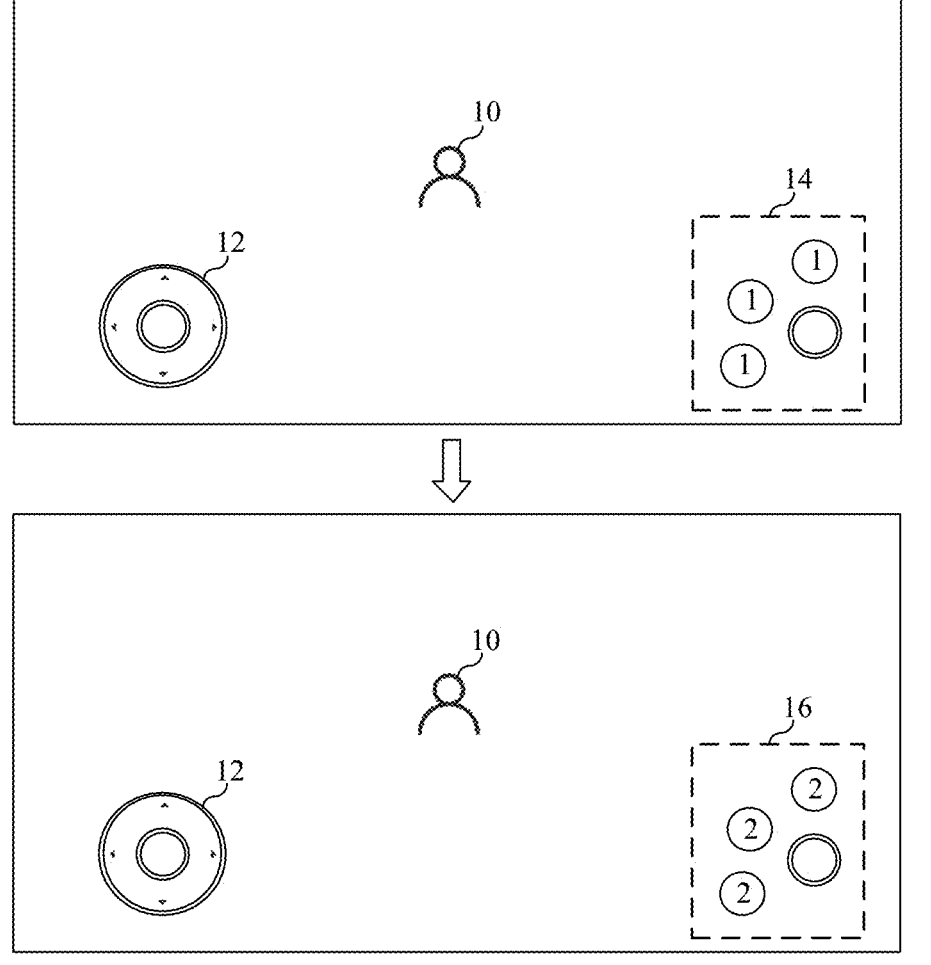

FIG. 3

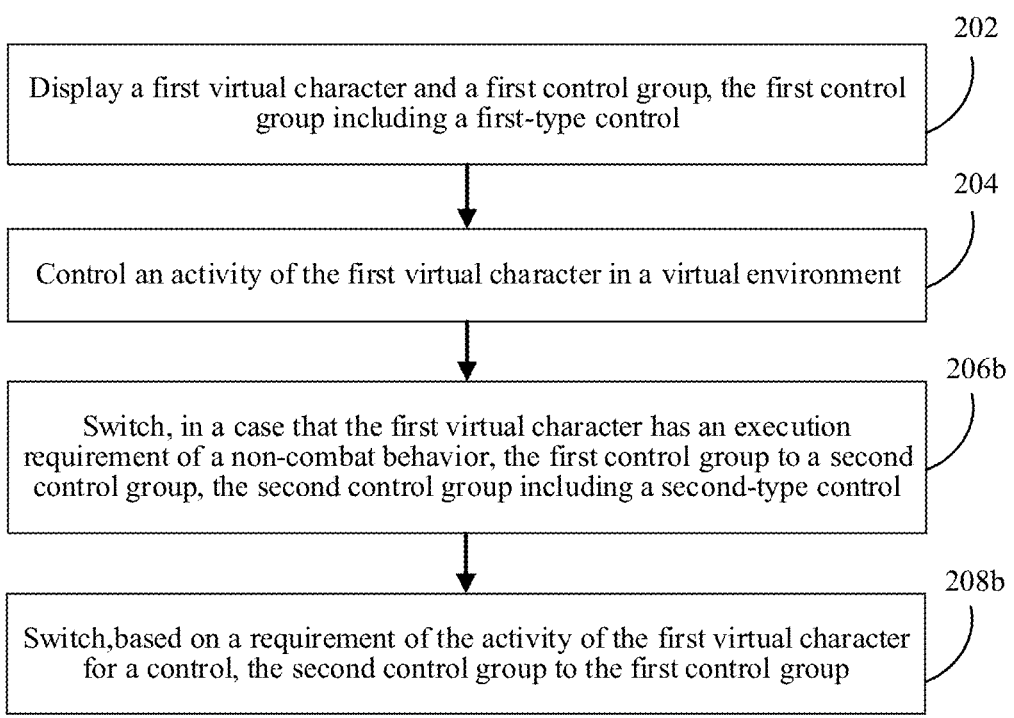

Display a first virtual character and a first control group, the first control group including a first-type control

202

Control an activity of the first virtual character in a virtual environment

204

Switch, in a case that the first virtual character has an execution requirement of a non-combat behavior, the first control group to a second control group, the second control group including a second-type control 206b Switch, based on a requirement of the activity of the first virtual character for a control, the second control group to the first control group 208b

FIG. 7

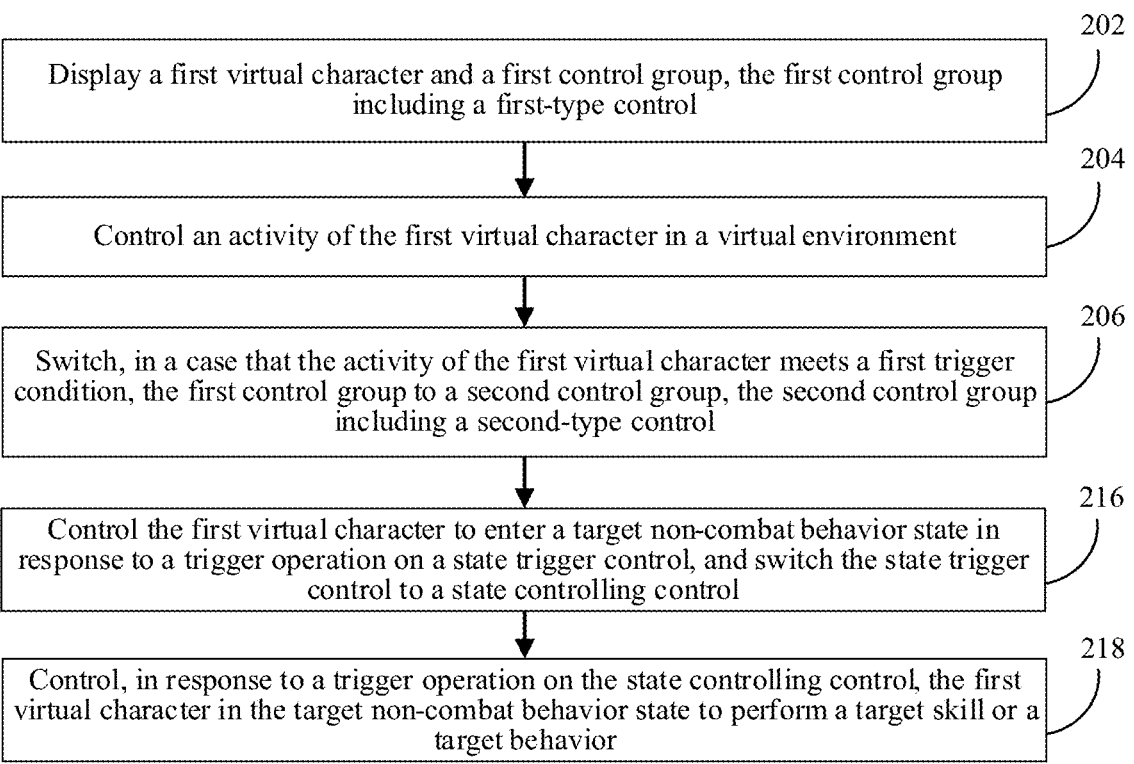

202

Display a first virtual character and a first control group, the first control group including a first-type control

204

Control an activity of the first virtual character in a virtual environment

206

Switch, in a case that the activity of the first virtual character meets a first trigger condition, the first control group to a second control group, the second control group including a second-type control

216

Control the first virtual character to enter a target non-combat behavior state in response to a trigger operation on a state trigger control, and switch the state trigger control to a state controlling control

218

Control, in response to a trigger operation on the state controlling control, the first virtual character in the target non-combat behavior state to perform a target skill or a target behavior

METHOD AND APPARATUS FOR CONTROLLING VIRTUAL CHARACTER, DEVICE, AND STORAGE MEDIUM

CROSS-REFERENCE TO RELATED APPLICATIONS

This application is a continuation application of International Application No. PCT/CN2022/098732, filed on Jul. 14, 2022, in the China National Intellectual Property Administration, which claims priority to Chinese Patent Application No. 202110809027.5, filed on Jul. 16, 2021, in the China National Intellectual Property Administration, which are incorporated herein by reference in their entirety.

FIELD

This disclosure relates to the field of human-computer interaction, and in particular, to controlling a virtual character in a virtual environment.

BACKGROUND

Double wheel is a human-computer interaction mode currently used in most mobile games. The double wheel includes: a mobile wheel on a left side and a combat wheel on a right side. The combat wheel includes a common attack button and several skill buttons around the common button.

In the related technology, a user uses the mobile wheel to control the movement of a game character in a mobile game in a virtual world, uses the common button in the combat wheel to control the game character in the mobile game to release common attack, and uses the skill buttons in the combat wheel to control the game character in the mobile games to release a combat skill.

In addition to the combat skill, the game character also has some non-combat behaviors such as meditation, becoming a snowman, dancing, and the like. The operation buttons of these non-combat behaviors are designed in multi-level menus. There are many steps when the user uses these non-combat behaviors, the user needs to open multi-level menus to find the corresponding operation buttons. The efficiency of human-computer interaction is relatively low because of such use of multiple steps.

SUMMARY

This disclosure provides a method and apparatus for controlling a virtual character, a device, and a storage medium, which can simplify the operations for controlling a virtual character and improve the intelligence of a computer device when displaying a control.

According to an aspect of this disclosure, a method for controlling a virtual character is provided, and is performed by a computer device. The method includes:

displaying a first virtual character and a first control group, the first control group including a first-type control;

controlling an activity of the first virtual character in a virtual environment; and switching the first control group to a second control group based on the activity of the first virtual character meeting a first condition, the second control group comprising a second-type control, wherein the first-type control is a control via which the first virtual character is triggered to release a skill, and the second-type control is a control via which the first virtual character is triggered to perform a non-combat behavior.

According to another aspect of this disclosure, an apparatus for controlling a virtual character is provided. The apparatus includes at least one memory configured to store computer program code; and at least one processor configured to access the computer program code and operate as instructed by the computer program code. The program code may include:

switching code configured to cause the at least one processor to switch a first control group to a second control group based on the activity of the first virtual character meeting a first condition, wherein the first control group comprises a first-type control and the second control group comprises a second-type control; and wherein the first-type control is a control via which the first virtual character is triggered to release a skill, and the second-type control is a control via which the first virtual character is triggered to perform a non-combat behavior.

According to another aspect of this disclosure, a computer device is provided, including a processor and a memory, the memory storing at least one instruction, at least one program, and a code set or an instruction set, the at least one instruction, the at least one program, and the code set or the instruction set being loaded and executed by the processor to implement the method for controlling a virtual character according to the present disclosure.

According to another aspect of this disclosure, a computer-readable storage medium is provided, storing at least one instruction, at least one program, a code set or an instruction set, the at least one instruction, the at least one program, the code set or the instruction set being loaded and executed by a computer device or a processor to implement the method for controlling a virtual character according to the present disclosure.

According to another aspect of this disclosure, a computer program product or a computer program is further provided, including computer instructions, the computer instructions being stored in a computer-readable storage medium. A processor of a computer device reads the computer instructions from the computer-readable storage medium, and executes the computer instructions, so that the computer device performs the method for controlling a virtual character provided in the implementations in the present disclosure.

According to the requirement of the activity of the first virtual character in the virtual environment for the control, the display of the first-type control in the first control group is canceled, and the display of the second-type control in the second control group is added, so that the second-type control is directly displayed on a most front-end interaction level. A user can directly trigger a non-combat behavior without searching for the second-type control at a deeper interaction level, which reduces interaction steps of the user, and improves the efficiency of human-computer interaction.

In addition, since the switch between the first control group and the second control group is dynamically triggered by the activity of the first virtual character, the switch between the first control group and the second control group has a certain degree of intelligence. This automatic switch process requires no manual operation of the user, and improves the intelligence of the control display.

BRIEF DESCRIPTION OF THE DRAWINGS

FIG. 2 is a flowchart of a process for controlling a virtual character according to an exemplary embodiment of the present disclosure.

FIG. 3 is a diagram of an interface for controlling a virtual character according to an exemplary embodiment of the present disclosure.

FIG. 7 is a flowchart of a process for controlling a virtual character according to an exemplary embodiment of the present disclosure.

FIG. 14 is a flowchart of a method for controlling a virtual character according to an exemplary embodiment of the present disclosure.

DESCRIPTION OF EMBODIMENTS

Figure 1:
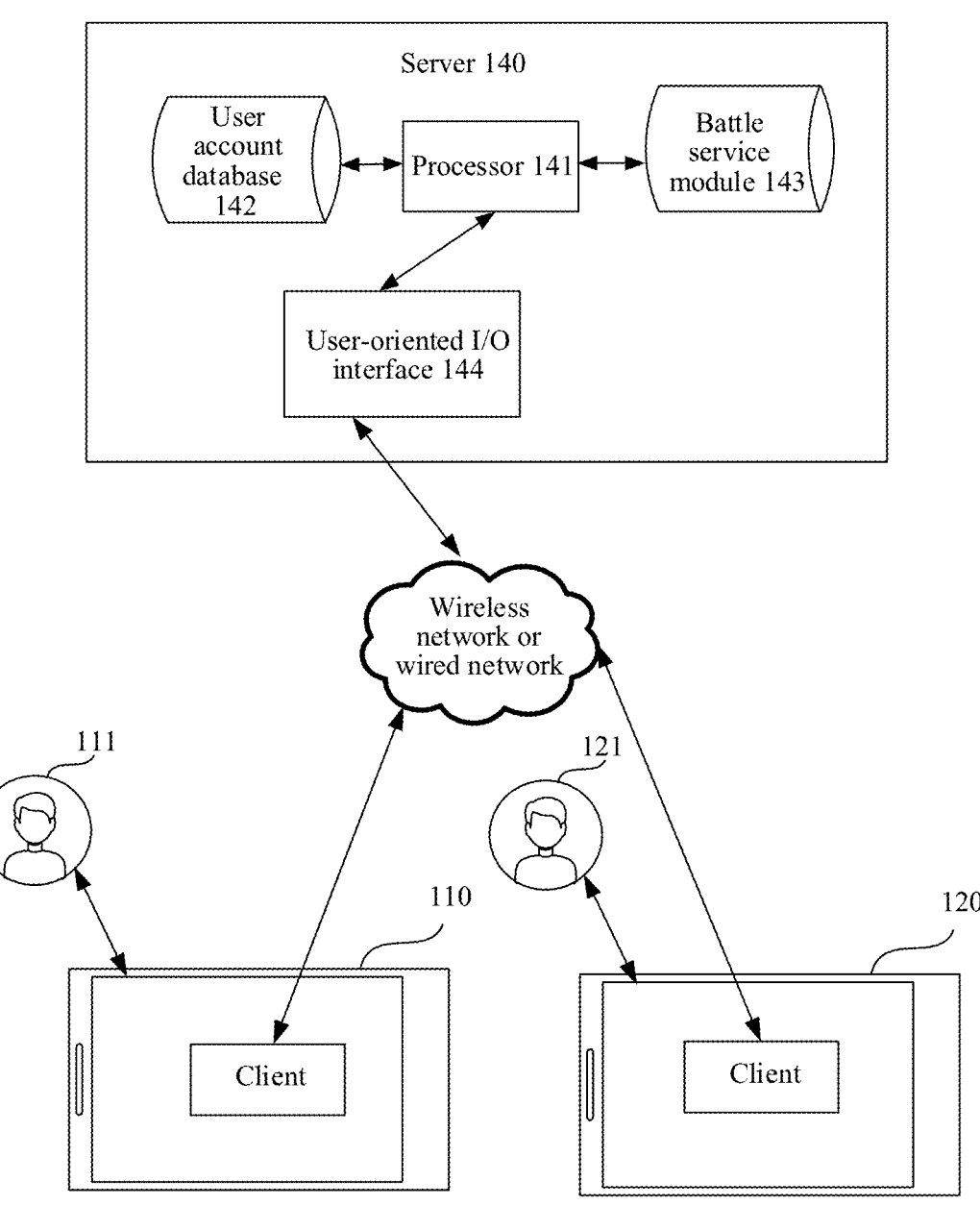
FIG. 1 is a structural block diagram of a computer system according to an exemplary embodiment of the present disclosure.

FIG. 1 is a structural block diagram of a computer system according to an exemplary embodiment of this disclosure. A computer system 100 includes: a first terminal 110, a second terminal 120, a first server 130, and a second server 140.

The first terminal 110 is installed and runs with a client, and the client is an disclosure program or a web page program that supports a virtual environment. For example, the client may specifically be any one of a massive multiplayer online role-playing game (Massive Multiplayer Online Role-Playing Game, MMOPRG), a first-person shooting (First-Person Shooting, FPS) game, a third-personal shooting (Third-Personal Shooting, TPS) game, a multiplayer online battle arena (Multiplayer Online Battle Arena, MOBA) game, a tactical competitive game, and a simulation game (Simulation Game, SLG). The first terminal 110 is a terminal used by a first user 111. The first user 111 uses the first terminal 110 to control a first virtual character located in the virtual environment in the client to perform an activity, and the first virtual character may be referred to as a virtual character of the first user 111. The activity of the first virtual character includes, but is not limited to: at least one of adjusting body postures, crawling, walking, running, riding, flying, jumping, driving, picking, shooting, attacking, and throwing.

The second terminal 120 is installed and runs with a client, and the client is an disclosure program or a web page program that supports a virtual environment. For example, the client can be specifically any one of a MMOPRG, a FPS game, a TPS game, a MOBA game, a tactical competitive game, and a SLG. The second terminal 120 is a terminal used by a second user 121. The second user 121 uses the second terminal 120 to control a second virtual character located in the virtual environment in the client to perform an activity, and the second virtual character may be referred to as a virtual character of the second user 121. The activity of the first virtual character includes, but is not limited to: at least one of adjusting body postures, crawling, walking, running, riding, flying, jumping, driving, picking, shooting, attacking, and throwing. For example, the virtual character is a simulated person character or a cartoon person character.

In an embodiment, the clients installed on the first terminal 110 and the second terminal 120 are the same, or the clients installed on the two terminals are the same type of clients on different control system platforms. The first terminal 110 may be generally one of a plurality of terminals, and the second terminal 120 may be generally one of a plurality of terminals. In this embodiment, only the first terminal 110 and the second terminal 120 are used for description. The device types of the first terminal 110 and the second terminal 120 are the same or different. The device types include: at least one of a smartphone, a tablet computer, an e-book reader, an MP3 player, an MP4 player, a laptop portable computer and a desktop computer. The following embodiment is described by using an example in which the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of this disclosure.

The first terminal 110 and the second terminal 120 are connected to the server 140 respectively by using a wireless network or a wired network.

The server 140 includes at least one of one server, a plurality of servers, a cloud computing platform, and a virtualization center. The server 140 is a server corresponding to the client for providing a background service for the client. In an embodiment, the server 140 is responsible for primary computing work, and the terminal is responsible for secondary computing work; or the server 140 is responsible for secondary computing work, and the terminal is responsible for primary computing work; or a distributed computing architecture is adopted between the server 140 and the terminal to perform collaborative computing.

In an embodiment, the foregoing terminals and servers are computer devices.

In a schematic example, the server 140 includes a processor 141, a user account database 142, a battle service module 143, and a user-oriented input/output (I/O) interface 144. The processor 141 is configured to load instructions stored in the second server 140, and process data in the user account database 142 and the battle service module 143. The user account database 142 is configured to store data of user accounts used by the first terminal 110 and the other terminals, for example, avatars of the user accounts, nicknames of the user accounts, battle effectiveness indexes of the user accounts, and service zones of the user accounts. The battle service module 143 is configured to provide a plurality of battle rooms for the user to battle. The user-oriented I/O interface 144 is configured to establish communication between the first terminal 110 and the second terminal 120 via a wireless network or a wired network for data exchange.

FIG. 2 is a flowchart of a method for controlling a virtual character according to an exemplary embodiment of this disclosure. The method is executed by a computer device, or by a terminal, or by a client in a terminal. The computer device or the terminal is provided with a touch screen. The method includes:

Operation 202: Display a first virtual character and a first control group, the first control group including a first-type control, the first-type control being configured to trigger the first virtual character to release a skill.

Take an example in which a client is installed in a terminal. The client running in the terminal is an disclosure program or a web page client that supports a virtual environment. A virtual environment is a displayed (provided) environment or world by a client when running on a terminal. The virtual environment may be a simulated environment of a real world, or may be a semi-simulated and semi-fictional environment, or may be a completely fictional environment. The virtual environment may be any one of a two-dimensional virtual environment, a 2.5-dimensional virtual environment, and a 3D virtual environment. This is not limited in this embodiment of this disclosure.

A first user account is logged in to the client, and there are a plurality of virtual characters in the virtual environment. The first user account has a control authority over the first virtual character. A virtual character is at least one movable object that is controlled by the user in a virtual environment. The virtual character may be a virtual role, a virtual animal, or a cartoon character. In an embodiment, the virtual character is a three-dimensional model created based on a skeletal animation technology. Each virtual character has its own shape and volume in the virtual environment, and occupies a part of spaces in the virtual environment.

A control is an element with human-computer interaction capability on the user interface. A control is used to control the first virtual object to release a skill.

In an embodiment, the terminal displays a virtual environment screen and the first control group on an upper layer of the virtual environment screen. The virtual environment screen is a screen obtained by shooting (rendering) the virtual environment using a camera model. All or part of a first virtual character model is displayed in the virtual environment screen. The first control group is overlapped and displayed on the virtual environment screen, for example, the first control group is overlapped and displayed on a lower right region of the virtual environment screen. The lower right region is obtained by dividing the virtual environment screen into an upper left region, a lower left region, an upper right region, and a lower right region.

The first control group includes one or more first-type controls. The first-type control is configured to trigger the first virtual character to release a skill. In an embodiment, the skill may be a skill of combat category; or the skill may be a skill whose use frequency is greater than a threshold; or the skill is a skill of first category. In this embodiment of this disclosure, take an example in which the skill may be a skill of combat category. In an embodiment, in addition to the first-type control, the first control group can also include other types of controls, such as a wheel button for triggering common attacks.

Operation 204: Control an activity of the first virtual character in a virtual environment.

Activity is a general name of all possible activities performed by the first virtual character in the virtual environment. The activity includes, but is not limited to: at least one of standing, adjusting body postures, crawling, walking, running, riding, flying, jumping, driving, picking, shooting, attacking, throwing, or dazing.

Operation 206: Switch, based on a requirement of the activity of the first virtual character for a control, the first control group to a second control group, the second control group including a second-type control.

For example, in a case that the activity of the first virtual character meets a first trigger condition, the first control group is switched to the second control group.

The first trigger condition is configured to indicate that the activity of the first virtual character has no need to release the skill; or the first trigger condition is configured to indicate that the activity of the first virtual character has an execution requirement of a non-combat behavior; or the first trigger condition is configured to indicate that the activity of the first virtual character has no need to release the skill and has the execution requirement of releasing the non-combat behavior.

"Has no need to release the skill" can be understood as a prediction, not necessarily a meaning of "must not release the skill". "Has no need to release the skill" means that the skill will not be released in the case of great probability. Similarly, "has the execution requirement of releasing the non-combat behavior" is also a prediction, and the non-combat behavior is not necessarily released. "Has the execution requirement of releasing the non-combat behavior" means that the user will control the first virtual character to perform the non-combat behavior in the case of a large probability.

The second control group includes one or more second-type controls. The second-type control is configured to control the first virtual character to perform a non-combat behavior. Generally, the use frequency of the non-combat behavior is less than the threshold. In an embodiment, in addition to the second-type control, the second control group can also include other types of controls, such as a wheel button for triggering common attacks.

For example, the non-combat behavior is a behavior of action and expression category. The behavior of action and expression category is to control the first virtual character to perform a specified action or a combination action. For example, a skill of controlling the first virtual character to perform dancing, cooking, riding bamboo horses, snowball fights, and other activities.

The switching the first control group to the second control group includes: canceling the display of the first-type control in the first control group, and adding and displaying the second-type control in the second control group. In an embodiment, a region in which the first control group is located completely or partially overlaps a region in which the second control group is located. For example, display regions of the first control group and the second control group are all located in the lower right region of the virtual environment screen.

In addition to different categories of the controls, the second control group and the first control group may also be different in shape, quantity and layout method of the controls. For example, there are three first-type controls and two second-type controls. In an example, the first-type control is round, and the second-type control is rounded rectangle.

The second control group and the first control group may have the same control. For example, both the first control group and the second control group include a wheel button, and the wheel button is configured to trigger common attacks. In an example, both the first control group and the second control group include a third category skill button, such as a jumping button and a flying button.

For example, as shown in FIG. 3, the terminal displays a user interface, and the user interface includes a first virtual character 10, a mobile wheel 12, and a first control group 14. The first control group 14 includes three skill buttons 1 and a right wheel button. The skill buttons 1 are arranged along a peripheral contour of the right wheel button. The skill button 1 is configured to trigger a skill of combat category. The right wheel button is configured to trigger common attacks.

In a case that the activity of the first virtual character meets the first trigger condition, the first control group 14 is switched to a second control group 16. The second control group 16 includes three non-combat behavior buttons 2 and a right wheel button. The non-combat behavior buttons 2 are arranged along a peripheral contour of the right wheel button. The non-combat behavior button 2 is configured to trigger a skill or a behavior of non-combat category.

In conclusion, in the method provided in this embodiment, according to the requirement of the activity of the first virtual character in the virtual environment for the control, the display of the first-type control in the first control group is canceled, and the display of the second-type control in the second control group is added, so that the second-type control is directly displayed on a most front-end interaction level. A user can directly trigger a non-combat behavior through the second-type control without searching for the second-type control at a deeper interaction level, which reduces interaction steps of the user, and improves the efficiency of human-computer interaction.

In addition, since the switch between the first control group and the second control group is dynamically triggered by the activity of the first virtual character, the switch between the first control group and the second control group has a certain degree of intelligence, which requires no manual operation of the user, and improves the intelligence of the control display.

The foregoing first trigger condition includes, but is not limited to, the following three implementations:

1. The activity of the first virtual character is in a state without releasing a skill;
2. The activity of the first virtual character has an execution requirement of a non-combat behavior;
3. The activity of the first virtual character is in a state without releasing a skill, and the activity of the first virtual character has an execution requirement of the non-combat behavior.

Figure 4:
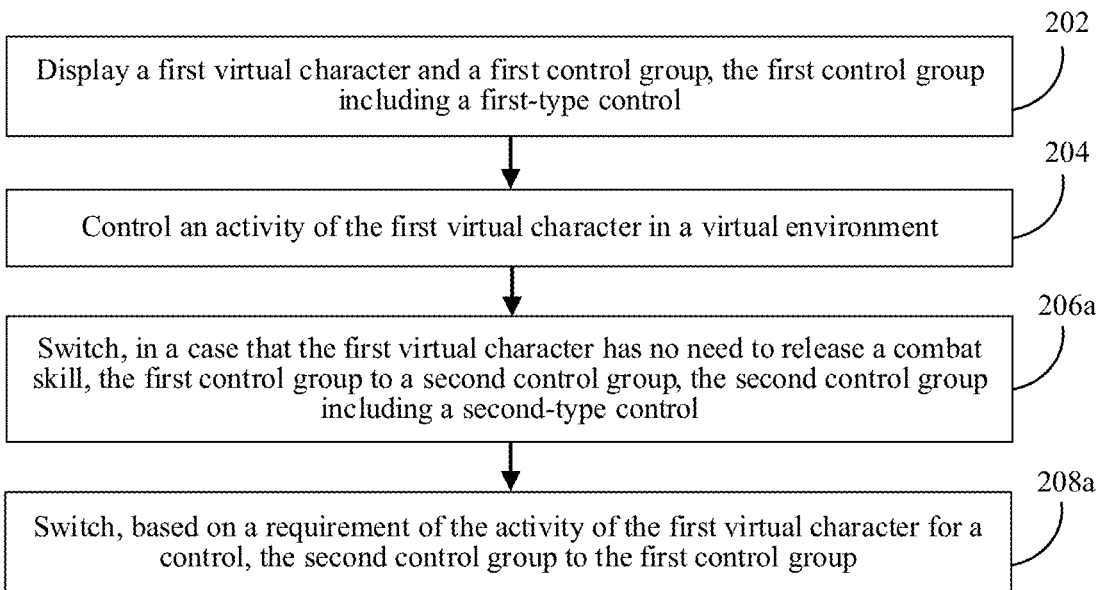
FIG. 4 is a flowchart of a process for controlling a virtual character according to an exemplary embodiment of the present disclosure.

For a first possible implementation:

FIG. 4 is a flowchart of a method for controlling a virtual character according to an exemplary embodiment of this disclosure. The method is performed by a terminal, or by a client in a terminal. The method includes:

Operation 202: Display a first virtual character and a first control group, the first control group including a first-type control, the first-type control being configured to trigger the first virtual character to release a skill, the skill being a skill of combat category.

The first control group includes one or more first-type controls. The first-type control is configured to trigger the first virtual character to release a skill. In an embodiment, the skill may be a skill of combat category; or the skill may be a skill whose use frequency is greater than a threshold; or the skill may be a skill whose use frequency is greater than a non-combat behavior; or the skill is a skill of first category. In this embodiment of this disclosure, take an example in which the skill may be a skill of combat category.

Figure 5:
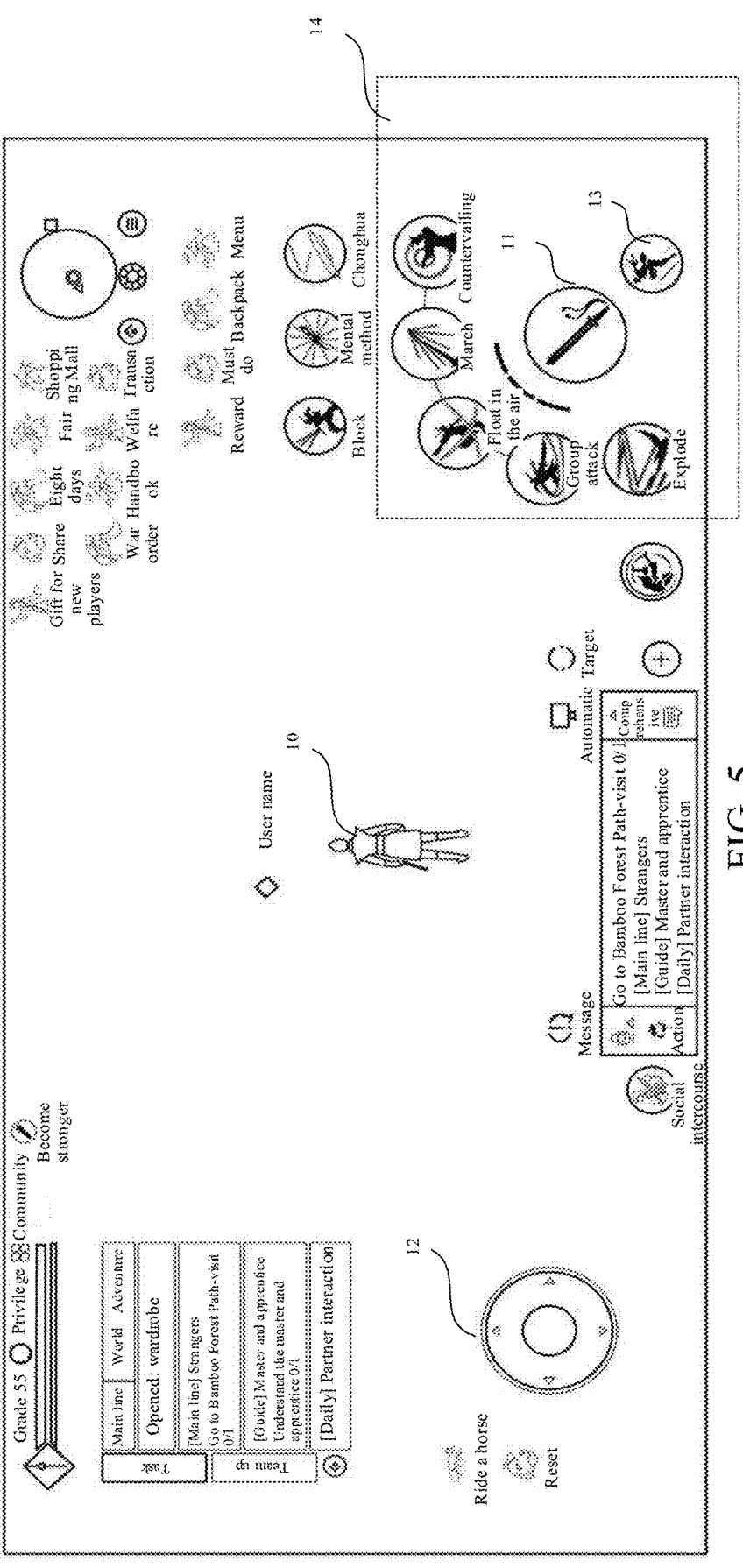
FIG. 5 is a diagram of an interface for controlling a virtual character according to an exemplary embodiment of the present disclosure.

For example, referring to FIG. 5, the terminal displays a user interface, and the user interface includes a first virtual character 10, a mobile wheel 12, and a first control group 14. In an embodiment, the first virtual character 10 is located in a 3D virtual environment, and in the virtual environment, there is a camera model corresponding to the first virtual character. The camera model is configured to collect the activity of the first virtual character in the 3D virtual environment to obtain the virtual environment screen. The virtual environment screen is displayed as a background layer of the user interface. Various controls are overlapped and displayed on the virtual environment screen.

Various controls include: an information exhibition control and a human-computer interaction control. The information exhibition control includes: a level control, a privilege control, a community control, a task information control, a team information control, a mini map control, and the like. The human-computer interaction control adopts a two-wheel layout on the whole: a mobile wheel 12 on a left side and a first control group 14 on a right side. The first control group 14 includes a wheel button 11 and a plurality of first-type controls arranged along a contour periphery 90 of the wheel button 11. The wheel button 11 is configured to trigger common attacks. Taking an example in which the first-type controls are five controls of combat category, the first-type controls include: a burst control, a group attack control, a floating control, a thrust control, and an anti-control control.

The first-type control is configured to control the first virtual character 10 to release a skill, for example, a combat skill.

In an embodiment, the first control group 14 further includes a third-type control 13. For example, the third-type control 13 is a jumping control or a rolling control.

Operation 204: Control an activity of the first virtual character in a virtual environment.

Activity is a general name of all possible activities performed by the first virtual character in the virtual environment. The activity includes, but is not limited to: at least one of standing, adjusting body postures, crawling, walking, running, riding, flying, jumping, driving, picking, shooting, attacking, throwing, or dazing (no activity or unconscious activity controlled by AI only).

In an embodiment, the user controls the activity of the first virtual character in a virtual environment through various human-computer controls. For example, the first virtual character is controlled to move in the virtual environment through the mobile wheel 12. In an example, the first virtual character is controlled to jump in the virtual environment through the jumping control.

Operation 206*a*: Switch, in a case that the activity of the first virtual character has no need to release the skill, the first control group to the second control group.

"Has no need to release the skill" can be understood as a prediction, not necessarily a meaning of "must not release the skill". "Has no need to release the skill" means that the skill will not be released in the case of great probability. This Operation may be implemented to be at least one of the following three methods:

Switch, in a case that the first virtual character is located in a non-combat region, the first control group to the second control group.

The virtual environment includes a plurality of regions. Different regions have different functions. The regions are divided according to function categories, including a hall region, a team region, a different continent region, a replica task region, and the like. The regions are divided according to the need for combat, including a combat region and a non-combat region. The non-combat region is a region that has no need to release a skill of combat category.

Since the skill of combat category is a skill used in the combat region, when the first virtual character is located in the non-combat region, the first virtual character does not need to release the skill. In this case, the first control group is switched to the second control group.

Switch, in a case that a duration for which the first virtual character leaves a combat region reaches a first duration, the first control group to the second control group.

In some virtual environments, the regions in the virtual environment are not only combat regions and non-combat regions, but also regions between them. For example, there is a large probability that some regions have no combat scenario, but the possibility of combat is not ruled out. As a possibility, the first control group is switched to the second control group, in a case that the duration for which the first virtual character leaves the combat region reaches the first duration.

For example, the first duration is 5 seconds, 10 seconds, 1 minute, and any other possible value.

Switch, in a case that an idle duration of the first control group reaches a second duration, the first control group to the second control group.

In some virtual environments, the combat regions and the non-combat regions cannot be clearly divided. As a possibility, the first control group is switched to the second control group, in a case that an idle duration of the first control group reaches a second duration. The idle duration refers to a duration when the first-type control in the first control group does not receive any trigger operation.

The second control group includes one or more second-type controls. The second-type control is configured to control the first virtual character to perform a non-combat behavior.

For example, the non-combat behavior is a behavior of action and expression category. The behavior of action and expression category is a skill of controlling the first virtual character to perform a specified action or a combination action. For example, a skill of controlling the first virtual character to perform dancing, cooking, riding bamboo horses, snowball fights, and other activities.

The switching the first control group to the second control group includes: canceling the display of the first-type control in the first control group, and adding and displaying the second-type control in the second control group.

In addition to different categories of the controls, the second control group and the first control group may also be different in shape, quantity and layout method of the controls. For example, there are three first-type controls and two second-type controls. In an example, the first-type control is round, and the second-type control is rounded rectangle.

Figure 6:
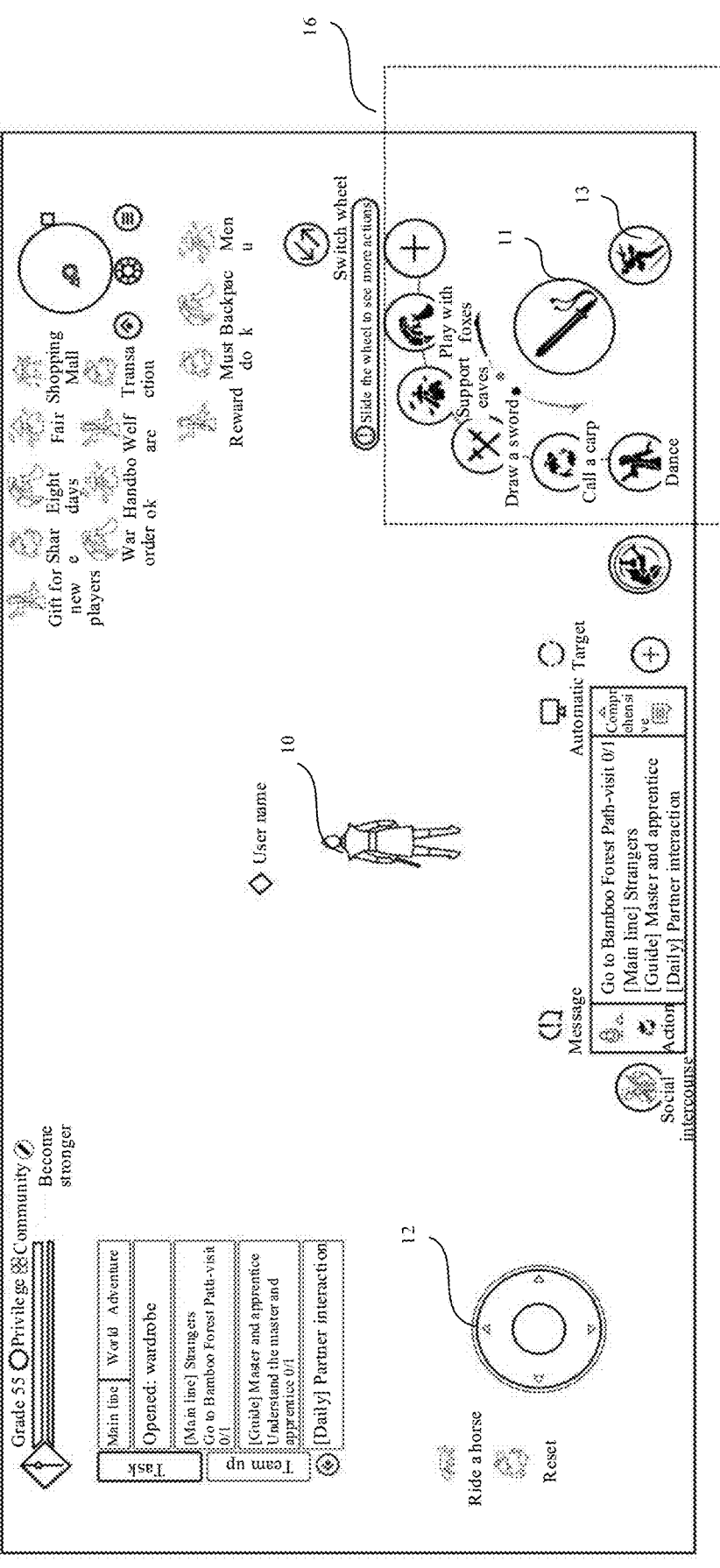
FIG. 6 is a diagram of an interface for controlling a virtual character according to an exemplary embodiment of the present disclosure.

For example, as shown in FIG. 6, the first control group 14 is switched to the second control group 16, in a case that the first virtual character 10 has no need to release the skill. The second control group 16 includes a plurality of second-type controls. Taking an example in which the second-type control includes five non-combat controls, the five non-combat controls include: a dance control, a bee summon control, a sword draw control, an eaves support control, a play with foxes control.

In an embodiment, the user can control the first virtual character to perform a non-combat behavior through the second-type control.

Operation 208*a*: Switch, according to the requirement of the activity of the first virtual character for the control, the second control group to the first control group.

For example, in a case that the activity of the first virtual character meets a second trigger condition, the second control group is switched to the first control group.

The second trigger condition includes: the first virtual character has an execution requirement of a skill. For example, the second trigger condition includes at least one of the following conditions:

Switch, in a case that the first virtual character is located in a combat region, the second control group to the first control group;

Switch, in a case that the duration for which the first virtual character leaves the non-combat region reaches a third duration, the second control group to the first control group;

Switch, in a case that the first virtual character is under attack, the second control group to the first control group; and Switch, in a case that an idle duration of the second control group reaches a second duration, the second control group to the first control group.

In an embodiment, the second control group is switched to the first control group, in a case that the idle duration of the second-type control in the second control group reaches the second duration.

Switch, in a case that the control of combat category in the second control group is triggered, the second control group to the first control group.

In addition to the second-type control, the second control group may further include a control of combat category. For example, the second control group includes a wheel button for triggering common attacks. When the user clicks the wheel button, the client is triggered to switch the second control group to the first control group.

The switching the second control group to the first control group includes: canceling the display of the second-type control in the second control group, and adding and displaying the first-type control in the first control group.

In conclusion, in the method provided in this embodiment, in a case that the first virtual character has no need to release the skill, the display of the first-type control in the first control group is canceled, and the display of the second-type control in the second control group is added, so that the second-type control is directly displayed on a most front-end interaction level intelligently. A user can directly trigger a non-combat behavior without searching for the second-type control at a deeper interaction level, which reduces interaction steps of the user, and improves the efficiency of human-computer interaction.

In the method provided in this embodiment, in a case that the first virtual character has the execution requirement of the skill, the display of the second-type control in the second control group is further canceled, and the display of the first-type control in the first control group is added, so that the second-type control is directly displayed on a most front-end interaction level intelligently. A user can directly trigger a non-combat behavior without searching for the second-type control at a deeper interaction level, which reduces interaction steps of the user, and improves the efficiency of human-computer interaction.

For a second possible implementation:

FIG. 7 is a flowchart of a method for controlling a virtual character according to an exemplary embodiment of this disclosure. The method is executed by a computer device, or by a terminal, or by a client in a terminal. The computer device or the terminal is provided with a touch screen. The method includes:

Operation 202: Display a first virtual character and a first control group, the first control group including a first-type control, the first-type control being configured to trigger the first virtual character to release a skill, the skill being a skill of combat category.

The first control group includes one or more first-type controls. The first-type control is configured to trigger the first virtual character to release a skill. In an embodiment, the skill may be a skill of combat category; or the skill may be a skill whose use frequency is greater than a threshold; or the skill may be a skill whose use frequency is greater than a non-combat behavior; or the skill is a skill of first category. In this embodiment of this disclosure, take an example in which the skill may be a skill of combat category.

For example, referring to FIG. 5, the terminal displays a user interface, and the user interface includes a first virtual character 10, a mobile wheel 12, and a first control group 14. In an embodiment, the first virtual character 10 is located in a 3D virtual environment, and in the virtual environment, there is a camera model corresponding to the first virtual character. The camera model is configured to collect the activity of the first virtual character in the 3D virtual environment to obtain the virtual environment screen. The virtual environment screen is displayed as a background layer of the user interface. Various controls are overlapped and displayed on the virtual environment screen.

Various controls include: an information exhibition control and a human-computer interaction control. The information exhibition control includes: a level control, a privilege control, a community control, a task information control, a team information control, a mini map control, and the like. The human-computer interaction control adopts a two-wheel layout on the whole: a mobile wheel 12 on a left side and a first control group 14 on a right side. The first control group 14 includes a wheel button 11 and a plurality of first-type controls arranged along a contour periphery of the wheel button 11. The wheel button 11 is configured to trigger common attacks. Taking an example in which the first-type controls are five controls of combat category, the first-type controls include: a burst control, a group attack control, a floating control, a thrust control, and an anti-control control.

The first-type control is configured to control the first virtual character 10 to release a skill, for example, a combat skill.

In an embodiment, the first control group 14 further includes a third-type control 13. For example, the third-type control 13 is a jumping control or a rolling control.

Operation 204: Control an activity of the first virtual character in a virtual environment.

Activity is a general name of all possible activities performed by the first virtual character in the virtual environment. The activity includes, but is not limited to: at least one of standing, adjusting body postures, crawling, walking, running, riding, flying, jumping, driving, picking, shooting, attacking, throwing, or dazing (no activity or unconscious activity controlled by AI only).

In an embodiment, the user controls the activity of the first virtual character in a virtual environment through various human-computer controls. For example, the first virtual character is controlled to move in the virtual environment through the mobile wheel 12. In an example, the first virtual character is controlled to jump in the virtual environment through the jumping control.

Operation 206b: Switch, in a case that the first virtual character has an execution requirement of the non-combat behavior, the first control group to the second control group.

"Has an execution requirement of the non-combat behavior" is a prediction, and does not necessarily release the non-combat behavior. "Has an execution requirement of the non-combat behavior" means that the non-combat behavior is released in the case of a large probability.

This Operation may be implemented to be at least one of the following two methods:

Switch, in a case that the first virtual character is located in a release region of the non-combat behavior, the first control group to the second control group.

The virtual environment includes a plurality of regions. Different regions have different functions. The regions are divided according to function categories, including a hall region, a team region, a different continent region, a replica task region, and the like. The regions are divided according to the need for combat, including a combat region and a non-combat region. The non-combat region is a region that has no need to release a skill of combat category.

In an embodiment, there are some non-combat regions that are release regions which need to release the non-combat behavior. When the first virtual character is located in these non-combat regions, the first control group is switched to the second control group.

Switch, in a case that the non-combat behavior includes a behavior of interacting with a target object, and a distance between the first virtual character and the target object is less than a threshold, the first control group to the second control group.

The target object is other virtual characters or NPCs in the virtual environment. Taking an example in which the target object is an NPC, in a case that the non-combat behavior includes a behavior of interacting with the NPC, and a distance between the first virtual character and the NPC is less than a threshold, the first control group is switched to the second control group.

The second control group includes one or more second-type controls. The second-type control is configured to trigger the first virtual character to release the non-combat behavior. In this embodiment of this disclosure, take an example in which the non-combat behavior is a behavior of interacting with the NPC for description.

The switching the first control group to the second control group includes: canceling the display of the first-type control in the first control group, and adding and displaying the second-type control in the second control group.

In addition to different categories of the controls, the second control group and the first control group may also be different in shape, quantity and layout method of the controls. For example, there are three first-type controls and two second-type controls. In an example, the first-type control is round, and the second-type control is rounded rectangle.

Figure 8:
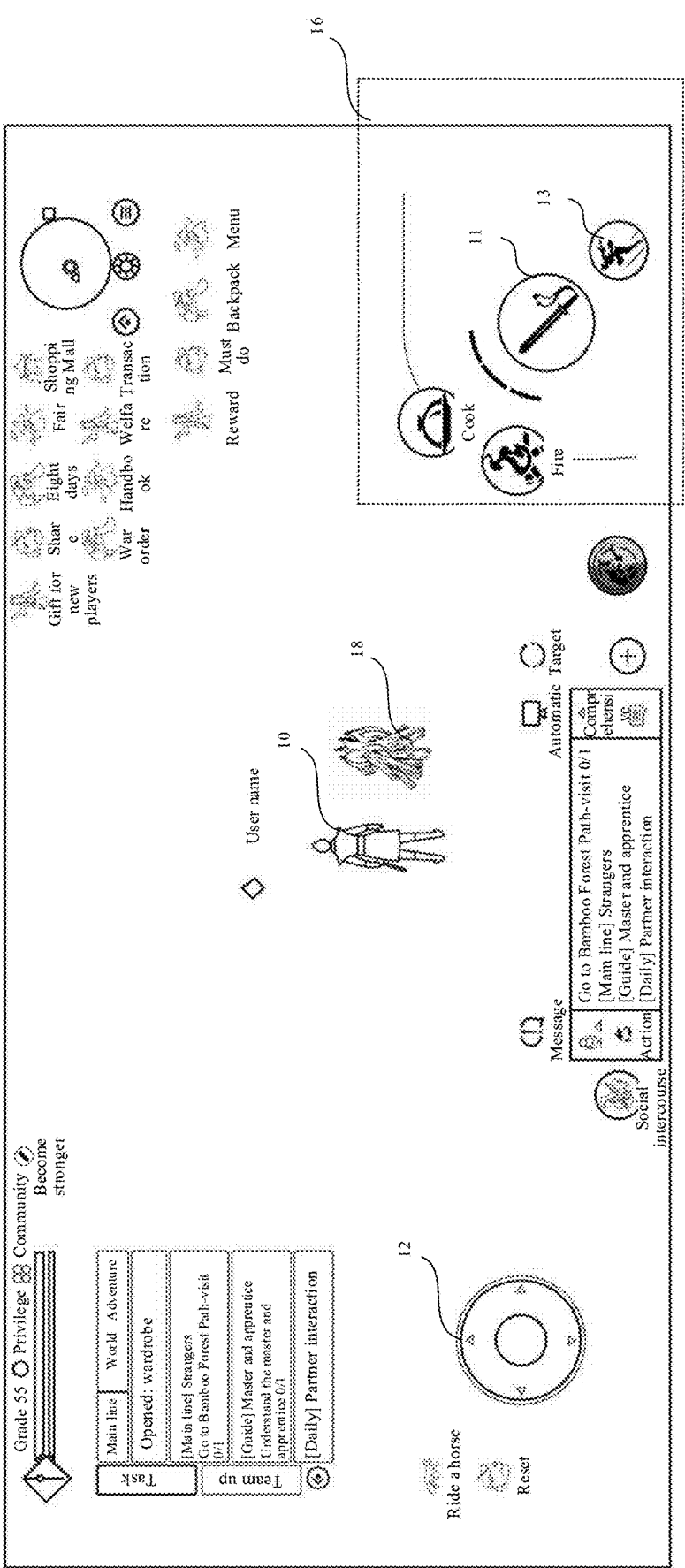
FIG. 8 is a diagram of an interface for controlling a virtual character according to an exemplary embodiment of the present disclosure.

For example, as shown in FIG. 8, it is assumed that a bonfire 18 is a static NPC (or prop), when the first virtual character 10 is close to the bonfire 18, the first control group 14 is switched to the second control group 16. The second control group 16 includes a plurality of second-type controls. Taking an example in which the second-type control includes two controls which interact with the NPC, the two controls which interact with the NPC include: a fire control and a cooking control.

In an embodiment, the user can control the first virtual character to release a skill of interacting with the NPC through the second-type control.

Operation 208b: Switch, according to the requirement of the activity of the first virtual character for the control, the second control group to the first control group.

For example, in a case that the second trigger condition is met, the second control group is switched to the first control group.

The second trigger condition includes: the first virtual character has no need to perform the non-combat behavior. For example, the second trigger condition includes at least one of the following conditions:

Switch, in a case that the duration for which the first virtual character leaves the non-combat region reaches a third duration, the second control group to the first control group; and Switch, in a case that an idle duration of the second control group reaches a second duration, the second control group to the first control group.

In an embodiment, the second control group is switched to the first control group, in a case that the idle duration of the second-type control in the second control group reaches a fourth duration.

Switch, in a case that the control of combat category in the second control group is triggered, the second control group to the first control group.

In addition to the second-type control, the second control group may further include a control of combat category. For example, the second control group includes a wheel button for triggering common attacks. When the user clicks the wheel button, the client is triggered to switch the second control group to the first control group.

Switching, in a case that the non-combat behavior includes a behavior of interacting with a target object, and a distance between the first virtual character and the target object is greater than a threshold, the second control group to the first control group.

For example, in a case that the non-combat behavior includes a behavior of interacting with the NPC, and a distance between the first virtual character and the NPC is greater than a threshold, the second control group is switched to the first control group. For example, after the user leaves the NPC, the display of the second-type control in the second control group is canceled, and the display of the first-type control in the first control group is added.

The switching the second control group to the first control group includes: canceling the display of the second-type control in the second control group, and adding and displaying the first-type control in the first control group.

In conclusion, in the method provided in this embodiment, in a case that the first virtual character needs to release the non-combat behavior, the display of the first-type control in the first control group is canceled, and the display of the second-type control in the second control group is added, so that the second-type control is directly displayed on a most front-end interaction level intelligently. A user can directly trigger a non-combat behavior without searching for the second-type control at a deeper interaction level, which reduces interaction steps of the user, and improves the efficiency of human-computer interaction.

In the method provided in this embodiment, in a case that the first virtual character has no need to release the non-combat behavior, the display of the second-type control in the second control group is further canceled, and the display of the first-type control in the first control group is added, so that the second-type control is directly displayed on a most front-end interaction level intelligently. A user can directly trigger a non-combat behavior without searching for the second-type control at a deeper interaction level, which reduces interaction steps of the user, and improves the efficiency of human-computer interaction.

Figure 9:
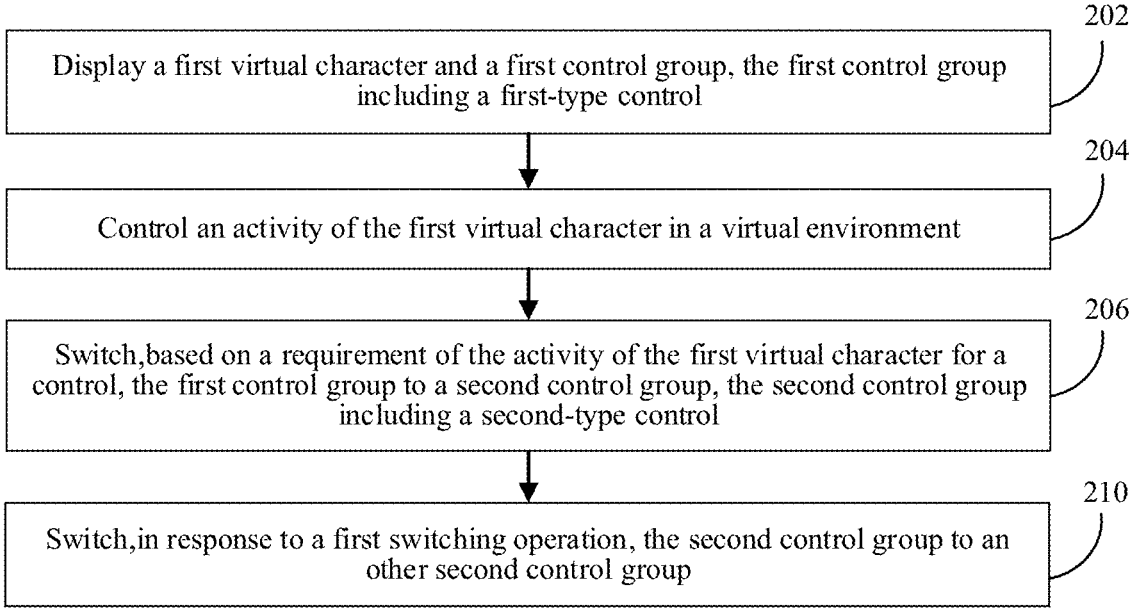
FIG. 9 is a flowchart of a method for controlling a virtual character according to an exemplary embodiment of the present disclosure.

In some embodiments, the second control group includes at least two groups. In the process of displaying the second control group, switch can be performed between the second control groups of different groups. As shown in FIG. 9, the foregoing method further includes:

Operation 210: Switch, in response to a first switching operation, the second control group to an other second control group.

For example, the second control group includes a second control group A and a second control group B. The second control group A is switched to a second control group B, in response to the first switching operation.

In an embodiment, the second-type control corresponding to the skill of interacting with the NPC is divided into the second control group A, and the second-type control corresponding to the action and expression skill is divided into the second control group B. In a case that the first virtual character is close to the NPC, the first control group is switched to the second control group A; and in a case that the first virtual character leaves the combat region, the first control group is switched to the second control group B.

The first switching operation is any human-computer interaction operation that may trigger a switch between different second control groups. For example, the first switching operation is a sliding operation, a click operation, a touch operation, a pressure touch operation, a physical key operation, a rocker operation, an eye movement control operation, and the like.

In the process of displaying the second control group, a switching button can be added and displayed on a peripheral side of the second control group, and the switching button is configured to perform switch between the second control groups of different groups; The second control group is switched to an other second control group, in response to the first switching operation on the switching button.

Figure 10:
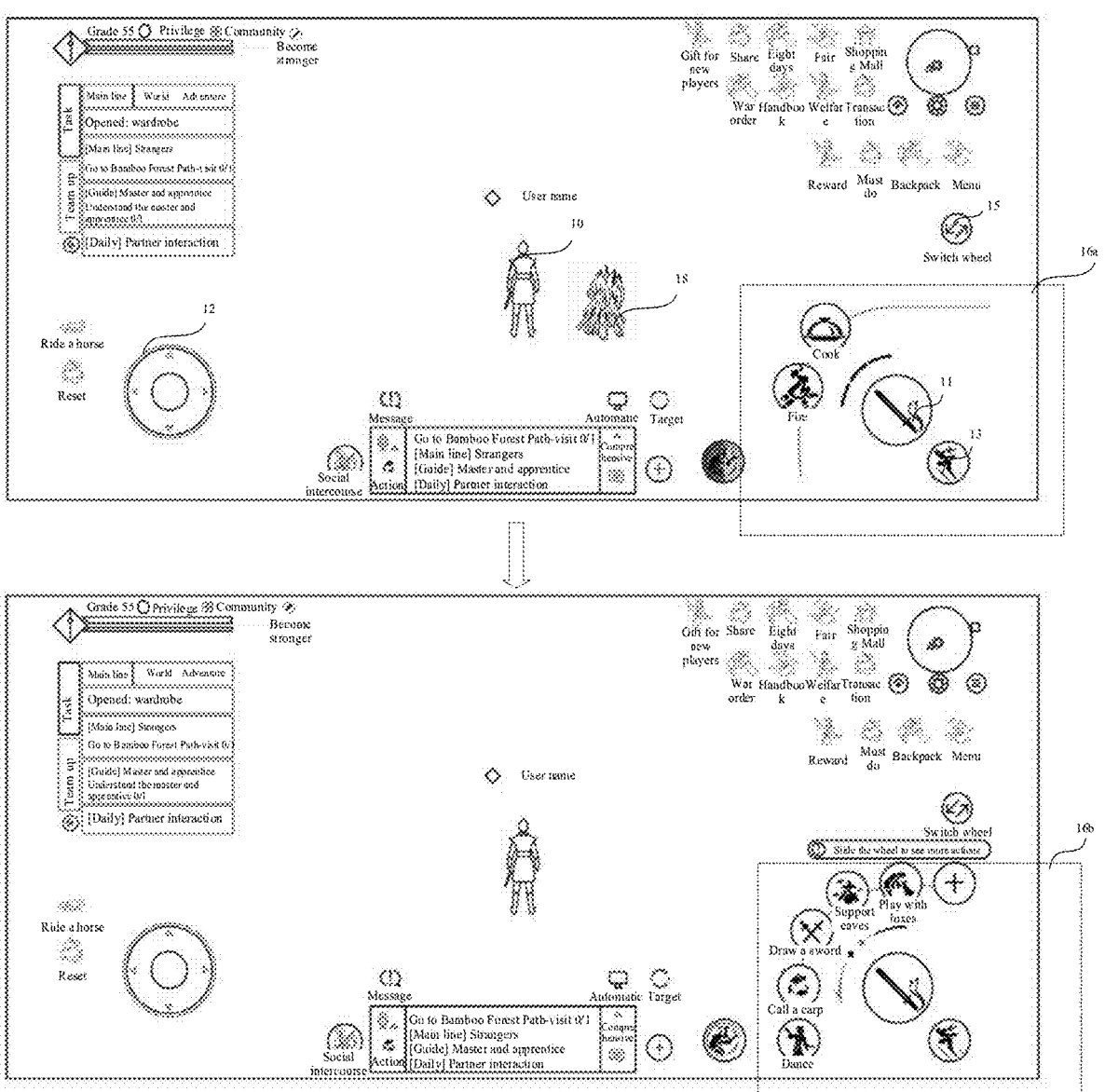
FIG. 10 is a diagram of an interface of a method for controlling a virtual character according to an exemplary embodiment of the present disclosure.

For example, as shown in FIG. 10, after switching the first control group to a second control group 16a, the second control group 16a displays the fire control and the cooking control that interact with the bonfire 18. In addition, a switching button 15 is added and displayed on the peripheral side of the second control group 16a, and the switching button 15 is a button configured to perform switch between the second control group 16a and a second control group 16b.

When the user clicks the switching button 15, the second control group 16a is switched to the second control group 16b, and the second control group 16b displays the dance control, the bee summon control, the sword draw control, the eaves support control, the play with foxes control.

When the user clicks the switching button 15 again, the second control group 16*b* is switched to the second control group 16*a*.

In some embodiments, the foregoing switch between the different second control groups can also be triggered automatically. For example, in a case that a distance between the first virtual character and the target object is less than a threshold, the second control group A is switched to the second control group B; and in a case that a distance between the first virtual character and the target object is greater than a threshold, the second control group B is switched to the second control group A.

In an example, in some embodiments, the first virtual character is controlled to summon the target object in the virtual environment, in response to a summon operation on a summon control; and the second control group is switched to an other second control group, and the second-type control in the other second control group is configured to release the behavior of interacting with the target object.

In conclusion, in the method provided in this embodiment, through providing at least two different second control groups, so that the more second control groups can be directly displayed on a most front-end interaction level. A user can directly trigger a non-combat behavior without searching for the second-type control at a deeper interaction level, which reduces interaction steps of the user, and improves the efficiency of human-computer interaction.

Figure 11:
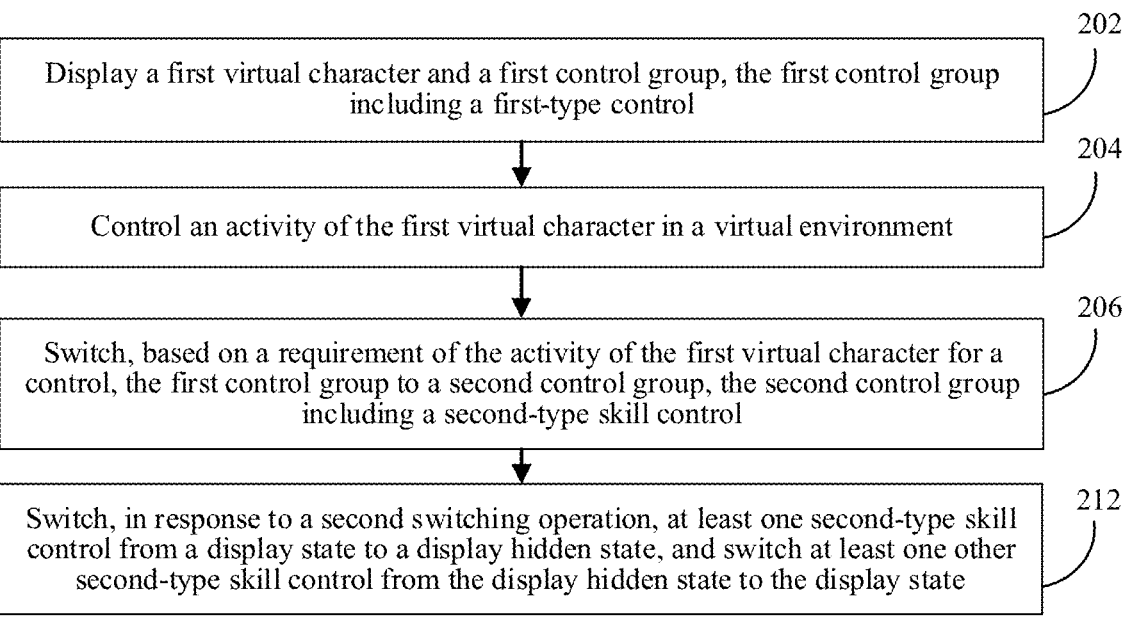
FIG. 11 is a flowchart of a method for controlling a virtual character according to an exemplary embodiment of the present disclosure.

In some embodiments, there are a plurality of second-type controls in the second control groups of the same group. If the plurality of second-type controls cannot be displayed in the second control group at the same time, in the process of displaying the same second control group, switch may be performed between the second-type controls in different groups. As shown in FIG. 11, the foregoing method further includes:

Operation 212: Switch at least one second-type control from a display state to a display hidden state, in response to a second switching operation; and switch the at least one other second-type control from the display hidden state to the display state.

The second switching operation is any human-computer interaction operation that may trigger a switch between different second-type controls belonging to the same second control group. For example, the second switching operation is a sliding operation, a click operation, a touch operation, a pressure touch operation, a physical key operation, a rocker operation, an eye movement control operation, and the like.

For example, the second control group further includes: a wheel button, the second-type control in the display state being arranged along a peripheral contour of the wheel button; switching, in response to the second switching operation of sliding along the peripheral contour of the wheel button, the at least one second-type control from the display state to the display hidden state, and switching the at least one other second-type control from the display hidden state to the display state.

In a case that the second switching operation is a sliding operation that slides along the peripheral contour of the wheel button, at least one second-type control slides along a sliding direction, and when the second-type control moves out of the display region of the second-type control, the second-type control is switched from the display state to the display hidden state, and at least one other second-type control slides along the sliding direction, and when the other second-type control moves into the display region of the second-type control, the other second-type control is switched from the display hidden state to the display state.

In an embodiment, when the second switching operation disappears, at least one second-type control continues to slide along the sliding direction with a reduced sliding speed. When the second-type control moves out of the display region of the second-type control, the second-type control is switched from the display state to the display hidden state, and at least one other second-type control continues to slide along the sliding direction. When the other second-type control moves into the display region of the second-type control, the other second-type control is switched from the display hidden state to the display state until the sliding speed is reduced to zero.

As shown in FIG. 10, if the user slides along the peripheral contour of the wheel button 11 on the five second-type controls: the dance control, the bee summon control, the sword draw control, the eaves support control, the play with foxes control, more second-type controls related to action and expression can be seen.

For example, this embodiment designs a function that can switch the different display effects of the second-type control according to the arc touch and slide. The basic logic thereof is:

1. When an interface layer triggers a sliding event, a start coordinate of the sliding operation is recorded.
2. During the sliding process, according to a radian of the displacement of the sliding operation relative to the center of the circle, a display position of the current second-type control is correspondingly modified to achieve a disk sliding effect similar to fixing the center of the circle.
3. At the end of sliding, a closest stable state of the wheel disc is calculated according to the current display state of the second-type control, and a difference operation representation for a fixed time continues to be performed based on the position data of the stable state of the wheel disc (that is, the gradually slow disk sliding), so as to reach the stable state of the wheel disc in a short time.

In conclusion, in the method provided in this embodiment, through providing a plurality of second-type controls in the second control groups in the same group, so that more second-type controls can be directly displayed on a most front-end interaction level. A user can directly trigger a non-combat behavior without searching for the second-type control at a deeper interaction level, which reduces interaction steps of the user, and improves the efficiency of human-computer interaction.

Figure 12:
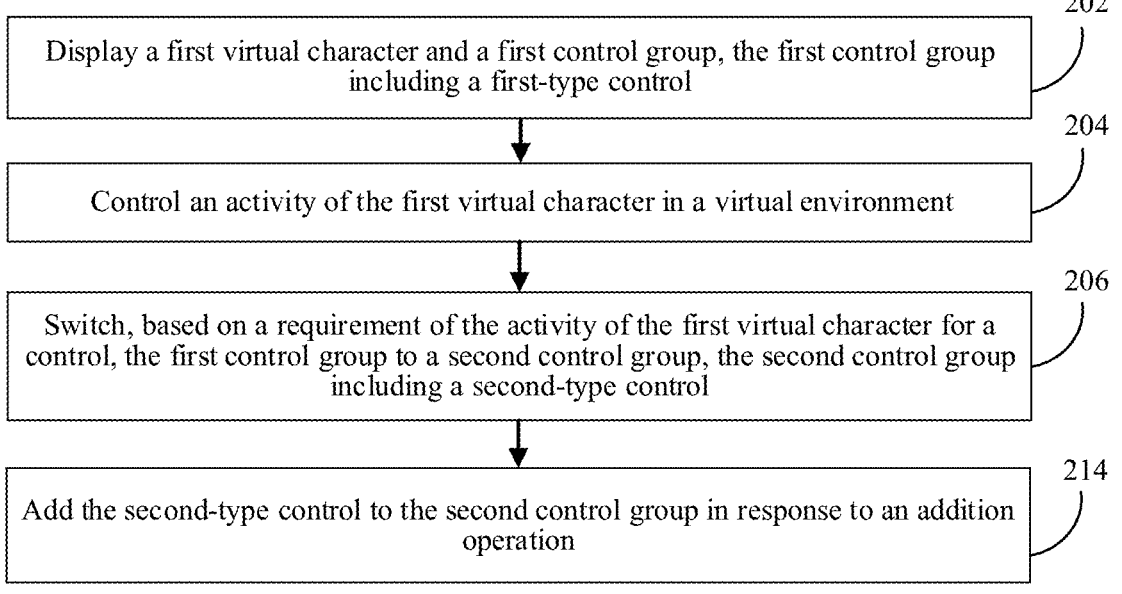
FIG. 12 is a flowchart of a method for controlling a virtual character according to an exemplary embodiment of the present disclosure.

In some embodiments, the second-type control in the second control group is system-defined or user-defined. In a case that the second-type control in the second control group supports customization, as shown in FIG. 12, the foregoing method further includes:

Operation 214: Add the second-type control to the second control group, in response to an addition operation.

The addition operation is any human-computer interaction operation that may trigger an addition of the second-type control to the second control group. For example, the addition operation is a sliding operation, a click operation, a touch operation, a pressure touch operation, a physical key operation, a rocker operation, an eye movement control operation, and the like.

Figure 13:
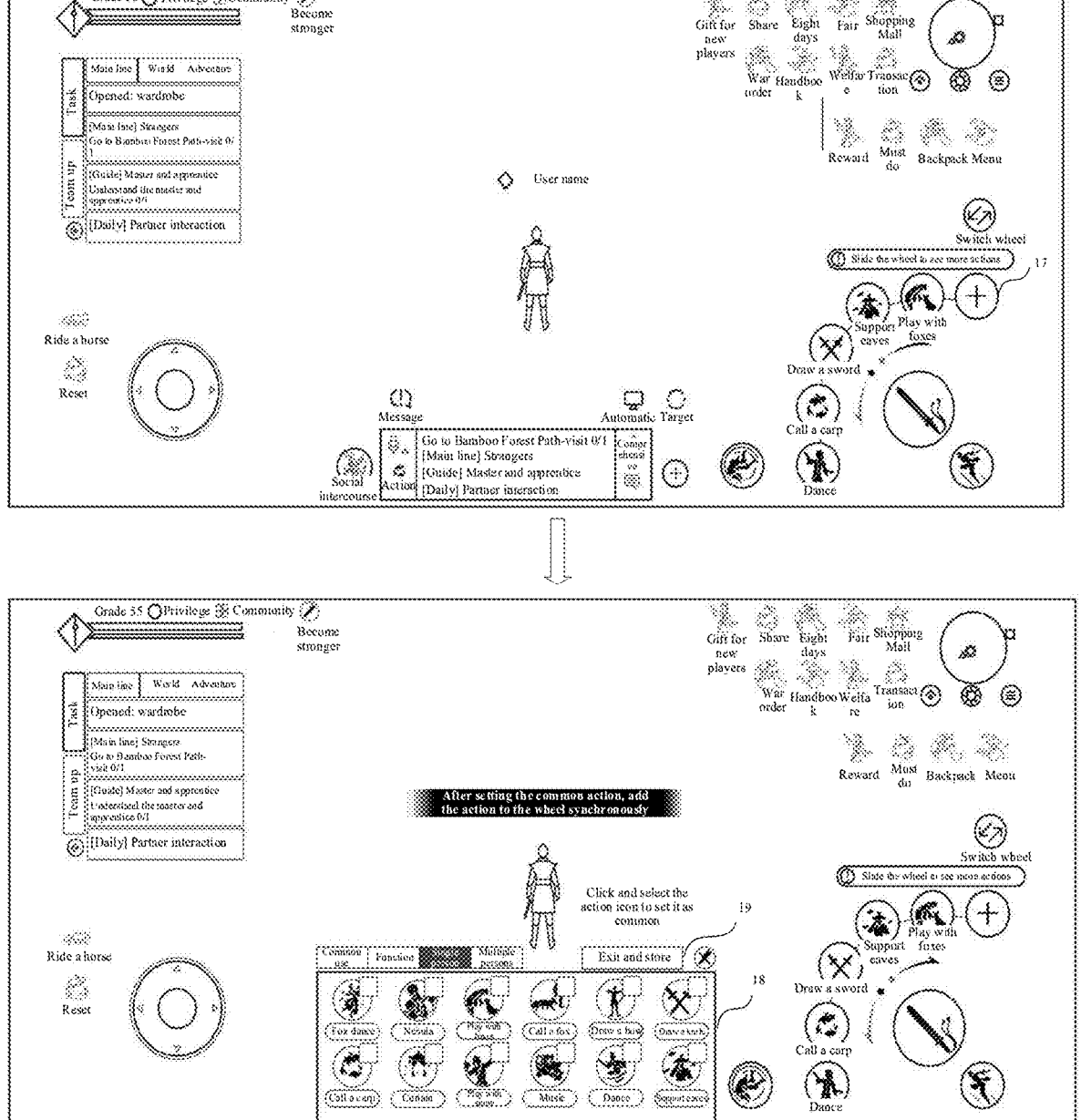
FIG. 13 is a diagram of an interface of a method for controlling a virtual character according to an exemplary embodiment of the present disclosure.

For example, as shown in FIG. 13, the second control group further includes: a blank control 17; displaying, in response to a trigger operation on the blank control 17, at least one candidate control 18 and one save control 19;

determining, in response to a selection operation on the candidate control 18, the selected candidate control 18 as a target control; and adding, in response to a save operation on the save control 19, the target control to the second-type control.

In conclusion, in the method provided in this embodiment, the customization function is provided for the second-type control in the second control group, so that more second-type controls can be directly displayed on a most front-end interaction level in a user-defined way. A user can directly trigger a non-combat behavior without searching for the second-type control at a deeper interaction level, which reduces interaction steps of the user, and improves the efficiency of human-computer interaction.

In some embodiments, there are one or more second-type controls for controlling the first virtual character to enter the target non-combat behavior state, referred to as the state trigger control for short. In the target non-combat behavior state, the first virtual character can also perform some unique actions or skills corresponding to the target non-combat behavior state. As shown in FIG. 14, the foregoing method further includes:

Operation 216: Control, in response to a trigger operation on the state trigger control, the first virtual character to enter a target non-combat behavior state; switch the state trigger control to a state controlling control;

one or more second-type controls is a state trigger control; and the state trigger control is a control that controls the first virtual character to enter the target non-combat behavior state. The target non-combat behavior state has at least one of the skills and activities corresponding to the target non-combat behavior state, such as the unique action and expression corresponding to the target non-combat behavior state. For example, the target non-combat behavior state is a transformation state, a driving state, a state of using specified props, and the like.

Taking an example in which the target non-combat behavior state is to ride a bamboo horse, the unique activity corresponding to the target non-combat behavior state is: jumping on a bamboo horse. Taking an example in which the target non-combat behavior state is to have a snowball fight, the unique activity corresponding to the target non-combat behavior state is: throw a snowball.

The state controlling control is configured to trigger the first virtual character to perform the skill corresponding to the target non-combat behavior state. For example, the state controlling control is a control for triggering the first virtual character to perform the requirement of throwing corresponding to the snowball fight.

Operation 218: Control, in response to the trigger operation on the state controlling control, the first virtual character in the target non-combat behavior state to perform a target skill or a target behavior.

Figure 15:
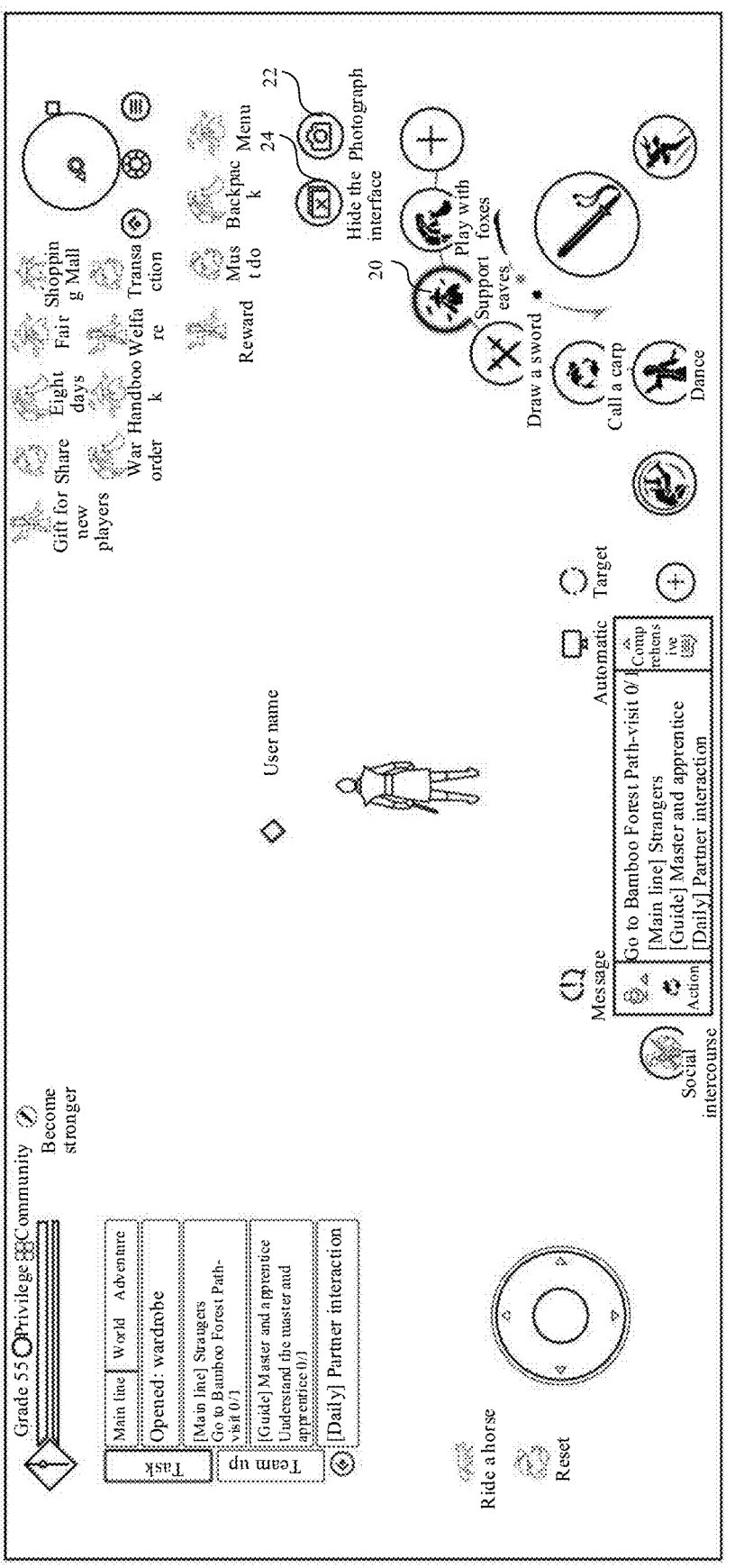
FIG. 15 is a diagram of an interface of a method for controlling a virtual character according to an exemplary embodiment of the present disclosure.

For example, as shown in FIG. 15, take the state trigger control "eave" 20 as an example. After the user clicks the state trigger control "eave" 20, the first virtual character puts on a hat, and the hat has a brim. At the same time, the state trigger control "eave" 20 is switched to a state controlling control. After the user clicks the state controlling control "eave" again, the first virtual character makes the action and expression of supporting the brim.

In an embodiment, the display of a shooting button 22 is added to the second control group, in response to a trigger operation on a state trigger control 20; and the activity of the first virtual character in the virtual environment is shot, in response to the trigger operation on the shooting button 22.

In an embodiment, the display of a hiding control button 24 is added to the second control group, in response to a trigger operation on a state trigger control 20; and all or some controls are hidden, in response to the trigger operation on the hiding control button 24.

In conclusion, the method provided in this embodiment, through switching the state trigger control to the state controlling control, can reduce a display quantity of a series of controls corresponding to the same second-type control, reduce the display of unnecessary controls, reduce the interaction steps of the user, and improve the efficiency of human-computer interaction.

Figure 16:
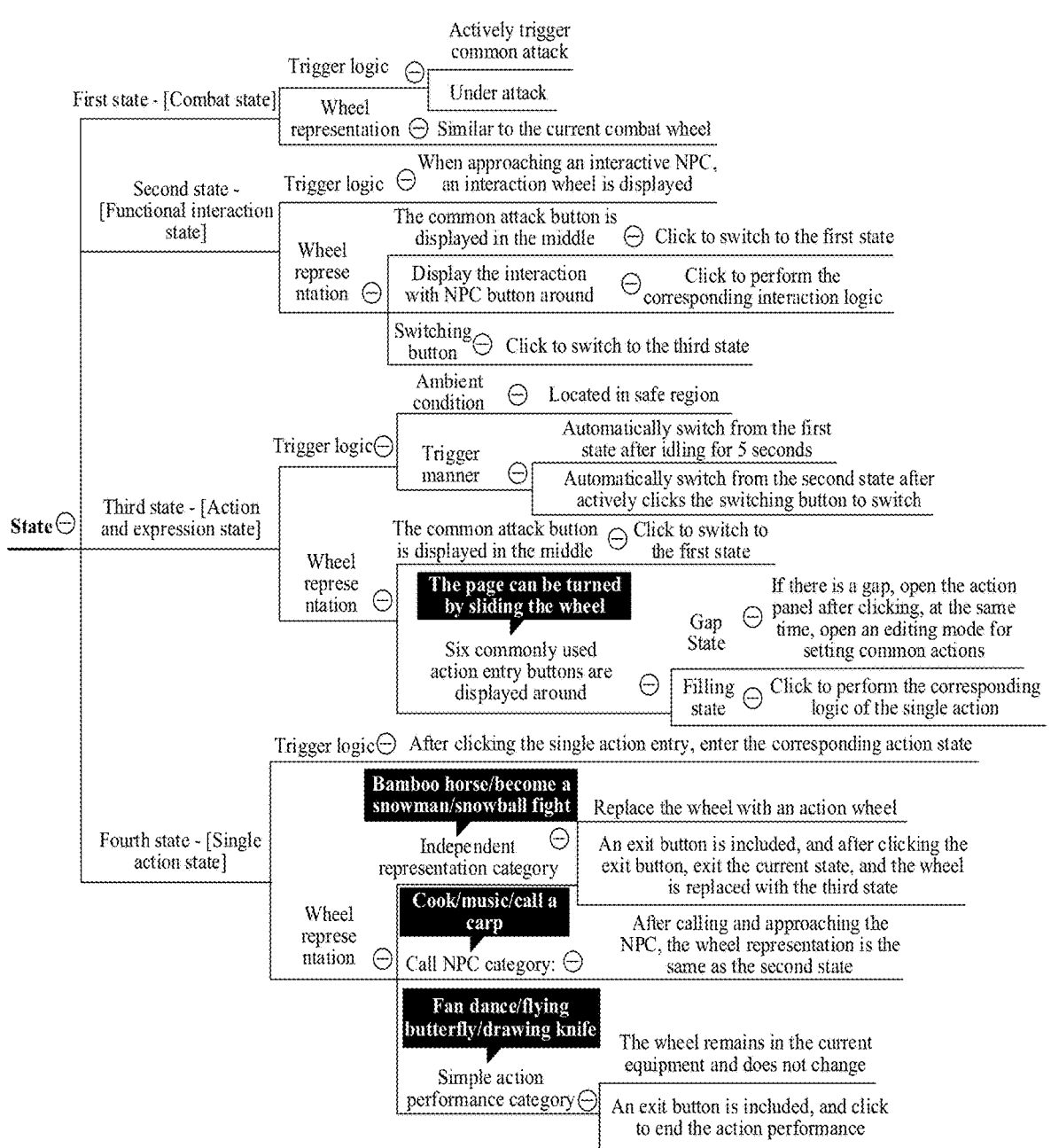
FIG. 16 is a diagram of triggering logic and wheel representation of four state interfaces according to an exemplary embodiment of the present disclosure.
Figure 17:
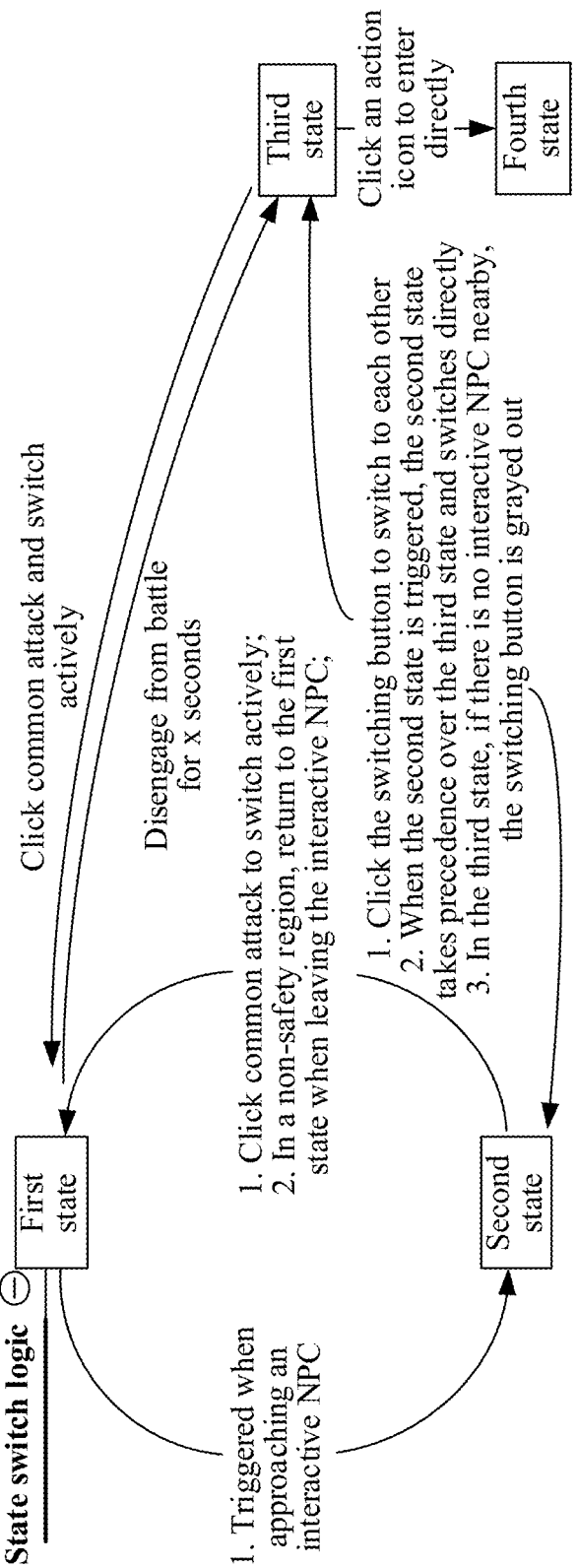
FIG. 17 is a schematic diagram of state switching logic of four state interfaces according to an exemplary embodiment of the present disclosure.

In an exemplary example, a state that displays the first control group is referred to as a first state, as shown in FIG. 5; a state that displays the second control group A is referred to as a second state, and a state that displays the second control group B is referred to as a third state, as shown in FIG. 10; and a state that displays the state controlling control is referred to as a fourth state, as shown in FIG. 15. The trigger logic and wheel representation of each interface in the foregoing fourth state are shown in FIG. 16 and FIG. 17.

The first state is a combat state.

The trigger logic of the first state includes:

The user actively triggers a common attack; and

The first virtual character is attacked.

The wheel representation of the first state:

Similar to the combat wheel. The combat wheel is a first control group that displays a control of combat category.

The second state is a functional interaction state including functional interaction with an NPC.

The trigger logic of the second state includes:

When approaching an interactive NPC, an interaction wheel is displayed. The interaction wheel is a second control group A.

The wheel representation of the second state:

A common attack button is displayed in the middle, and after clicking the common attack button, the second state is switched to the first state.

The interaction button that interacts with the NPC is displayed around the common attack button, and after clicking the interaction button, the corresponding interaction logic is performed.

The switching button is displayed in an upper right corner, and after clicking the switching button, the second state is switched to the third state.

The third state is a state including performing the action and expression.

The trigger logic of the third state includes:

Ambient condition: Located in a safe region.

Trigger manner: Automatically switch from the first state after idling for 5 seconds, or from the second state, the user actively clicks the switching button to switch.

The wheel representation of the third state:

A common attack button is displayed in the middle, and after clicking the common attack button, the third state is switched to the first state.

Six commonly used action entry buttons (also referred to as action and expression buttons) are displayed around the common attack button. If the action entry button is in a gap state (also referred to as the blank state), open an action panel after clicking. The action panel includes a plurality of candidate action entry buttons, and open an editing mode that sets commonly used action entry buttons at the same time; and If the action entry button is in a filled state, the logic corresponding to the single action and expression is performed after clicking.

The fourth state is that a game character is located in a target non-combat activity state.

The trigger logic of the fourth state includes:

After clicking the single action entry button, enter the corresponding action state.

The wheel representation of the fourth state:

Independent representation category: 1. The wheel is replaced with an action wheel corresponding to the action to control the subsequent action or exclusive action under the action state. 2. An exit button is included, and after clicking the exit button, exit the current state, and the wheel is replaced with the third state.

Summon NPC category: Click to summon the NPC. After the game character approaches the NPC, the wheel representation is the same as the second state.

Simple action performance category: 1. The wheel remains in the current state. 2. An exit button is included, and after clicking the exit button, exit the current state, and the wheel is replaced with the third state.

Figure 18:
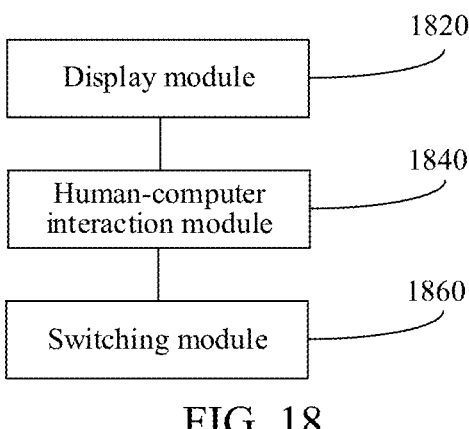
FIG. 18 is a structural block diagram of an apparatus for controlling a virtual character according to an exemplary embodiment of the present disclosure.

FIG. 18 is a block diagram of an apparatus for controlling a virtual character according to an exemplary embodiment of this disclosure. The apparatus includes:

a display module 1820, configured to display a first virtual character and a first control group, the first control group including a first-type control;

a human-computer interaction module 1840, configured to control an activity of the first virtual character in a virtual environment; and a switching module 1860, configured to switch, based on a requirement of the activity of the first virtual character for a control, the first control group to a second control group, the second control group including a second-type control, where the first-type control being configured to trigger the first virtual character to release a skill, and the second-type control being configured to control the first virtual character to perform a non-combat behavior.

In an optional design of this embodiment, the switching module 1860 is configured to switch, in a case that the first virtual character has no need to release the skill, the first control group to the second control group.

In an optional design of this embodiment, the switching module 1860 is configured to switch, in a case that the first virtual character is located in a non-combat region, the first control group to the second control group; or switch, in a case that a duration for which the first virtual character leaves a combat region reaches a first duration, the first control group to the second control group; or switch, in a case that an idle duration of the first control group reaches a second duration, the first control group to the second control group.

In an optional design of this embodiment, the switching module 1860 is configured to switch, in a case that the activity of the first virtual character has an execution requirement of the non-combat behavior, the first control group to the second control group.

In an optional design of this embodiment, the switching module 1860 is configured to switch, in a case that the first virtual character is located in a release region of the non-combat behavior, the first control group to the second control group; or switch, in a case that the non-combat behavior includes a behavior of interacting with a target object, and a distance between the first virtual character and the target object is less than a threshold, the first control group to the second control group.

In an optional design of this embodiment, there are at least two second control groups, and the switching module 1860 is configured to switch, in response to a first switching operation, the second control group to an other second control group.

In an optional design of this embodiment, the display module 1820 is configured to display a switching button, the switching button being configured to switch between the second control groups in different groups; and the switching module 1860 is configured to switch, in response to the first switching operation on the switching button, the second control group to the other second control group.

In an optional design of this embodiment, there are at least two second control groups, and the second-type control includes a summon control for summoning the target object; and the display module 1820 is configured to control the first virtual character to summon the target object in the virtual environment in response to a summon operation on the summon control; and the switching module 1860 is configured to switch the second control group to an other second control group, and the second-type control in the other second control group is configured to release the behavior of interacting with an NPC.

In an optional design of this embodiment, the second control group includes: a second-type control in a display state and an other second-type control in a display hidden state; and a switching module 1860, configured to switch, in response to a second switching operation, at least one second-type control from the display state to the display hidden state; and switch the at least one other second-type control from the display hidden state to the display state.

In an optional design of this embodiment, the second control group further includes: a wheel button, the second-type control in the display state being arranged along a peripheral contour of the wheel button; and a switching module 1860, configured to switch, in response to the second switching operation of sliding along the peripheral contour of the wheel button, the at least one second-type control from the display state to the display hidden state, and switch the at least one other second-type control from the display hidden state to the display state.

In an optional design of this embodiment, the display module 1820 is configured to add the second-type control to the second control group in response to an addition operation.

In an optional design of this embodiment, the second control group further includes: a blank control; and a display module 1820, configured to display at least one candidate control and a save control in response to a trigger operation on the blank control; determine a selected candidate control as a target control in response to a selection operation on the candidate control; and add the target control to the second-type control in response to a save operation on the save control.

In an optional design of this embodiment, the second-type control includes a state trigger control;

a display module 1820, configured to control the first virtual character to enter a target non-combat behavior state in response to a trigger operation on the state trigger control, and switch the state trigger control to a state controlling control; and control, in response to a trigger operation on the state controlling control, the first virtual character in the target non-combat behavior state to perform a target activity.

In an optional design of this embodiment, the display module 1820 is configured to add and display a shooting button to the second control group in response to a trigger operation on a state trigger control; and shoot the activity of the first virtual character in the virtual environment in response to a trigger operation on the shooting button.

In an optional design of this embodiment, the display module 1820 is configured to add and display a control hidden button to the second control group in response to a trigger operation on a state trigger control; and hide all or some controls in response to a trigger operation on the control hidden button.

In an optional design of this embodiment, the switching module 1860 is configured to switch, based on the requirement of the activity of the first virtual character for the control, the second control group to the first control group.

In an optional design of this embodiment, the switching module 1860 is configured to switch, in a case that the first virtual character is located in a non-combat region, the second control group to the first control group;

or switch, in a case that the first virtual character is under attack, the second control group to the first control group;

or switch, in a case that the duration for which the first virtual character leaves the non-combat region reaches a third duration, the second control group to the first control group;

or switch, in a case that an idle duration of the second control group reaches a fourth duration, the second control group to the first control group;

or switch, in a case that the non-combat behavior includes the behavior of interacting with the target object, and the distance between the first virtual character and the target object is greater than the threshold, the second control group to the first control group.

It should be noted that: the apparatus for controlling a virtual character provided in the foregoing embodiments is illustrated with an example of division of the foregoing functional modules. In actual disclosure, the functions may be allocated to and completed by different functional modules according to requirements, that is, the internal structure of the device is divided into different functional modules, to implement all or some of the functions described above. In addition, the apparatus and method for controlling a virtual character provided in the foregoing embodiments belong to the same concept. For a specific implementation process, refer to the method embodiment, and details are not described herein again.

An embodiment of this disclosure further provides a computer device. The computer device includes: a processor and a memory, the memory storing at least one instruction, at least one program, a code set, or an instruction set, the at least one instruction, the at least one program, the code set, or the instruction set being loaded and executed by the processor to implement the method for controlling a virtual character provided in the foregoing method embodiments.

Figure 19:
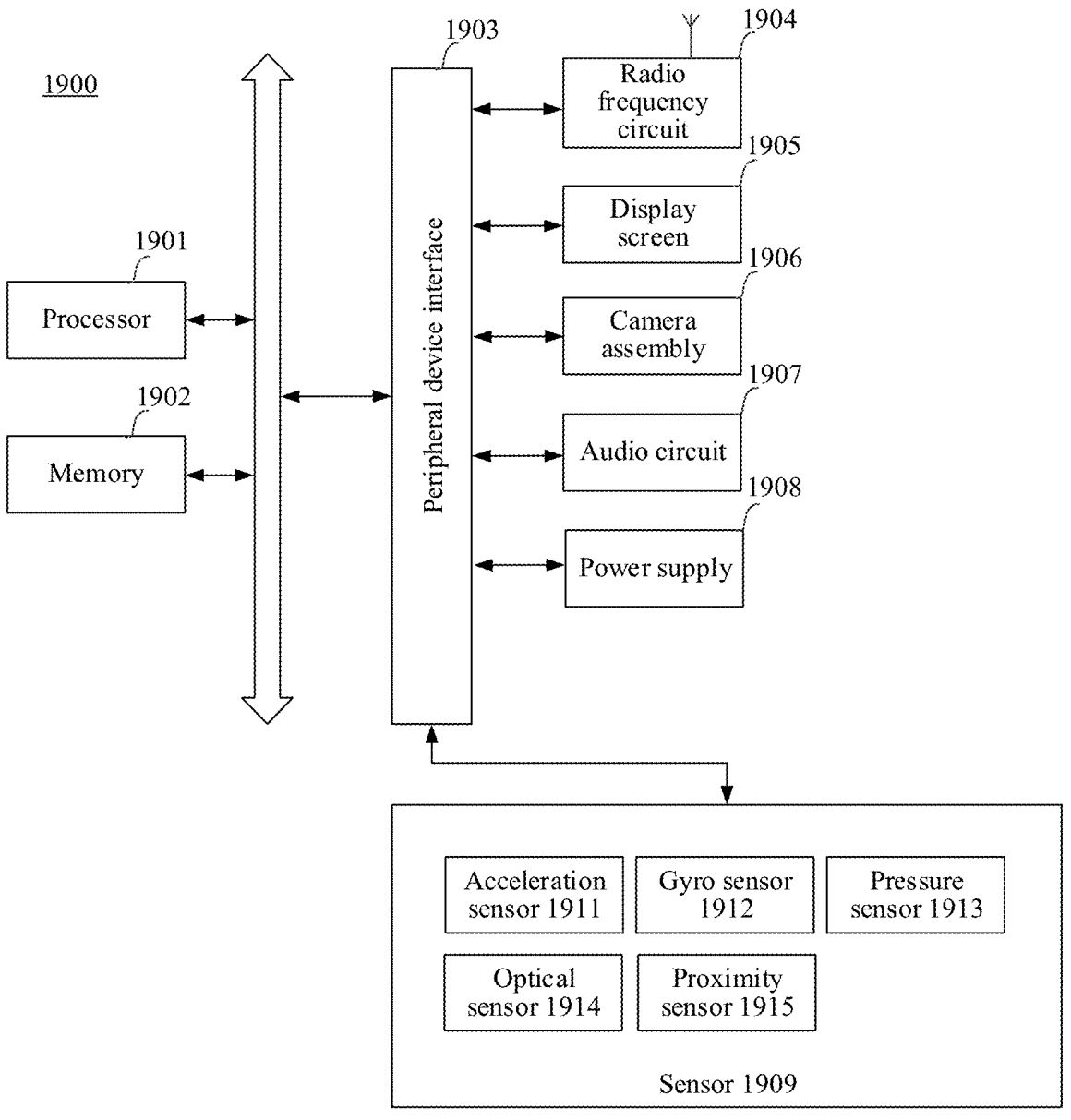
FIG. 19 is a structural block diagram of a terminal according to an exemplary embodiment of the present disclosure.

In an embodiment, the computer device is a terminal. For example, FIG. 19 is a schematic structural diagram of a terminal according to an exemplary embodiment of this disclosure.

Generally, a terminal 1900 includes: a processor 1901 and a memory 1902.

The processor 1901 may include one or more processing cores, such as a 4-core processor or an 8-core processor. The processor 1901 may be implemented by using at least one hardware form of a digital signal processor (DSP), a field-programmable gate array (FPGA), and a programmable logic array (PLA). The processor 1901 may further include a main processor and a coprocessor. The main processor is configured to process data in an active state, also referred to as a central processing unit (Central Processing Unit, CPU). The coprocessor is a low-power consumption processor configured to process data in a standby state. In some embodiments, the processor 1901 may be integrated with a graphics processing unit (GPU). The GPU is configured to be responsible for rendering and drawing content that a display needs to display. In some embodiments, the processor 1901 may further include an artificial intelligence (Artificial Intelligence, AI) processor. The AI processor is configured to process computing operations related to machine learning.

The memory 1902 may include one or more computer-readable storage media. The computer-readable storage media may be non-transitory. The memory 1902 may further include a high-speed random access memory, as well as non-volatile memory, such as one or more disk storage devices and flash storage devices. In some embodiments, the non-transient computer-readable storage medium in the memory 1902 is configured to store at least one instruction. The at least one instruction is executed by the processor 1901 to perform the method for controlling a virtual character provided in the method embodiment in this disclosure.

In some embodiments, the terminal 1900 may include: a peripheral device interface 1903 and at least one peripheral device. The processor 1901, the memory 1902, and the peripheral device interface 1903 may be connected by using a bus or a signal cable. Each peripheral device may be connected to the peripheral device interface 1903 by using a bus, a signal cable, or a circuit board. Specifically, the peripheral device includes: at least one of a radio frequency circuit 1904, a display screen 1905, a camera assembly 1906, an audio circuit 1907, and a power supply 1908.

The peripheral interface 1903 may be configured to connect at least one input/output (I/O)-related peripheral to the processor 1901 and the memory 1902. In some embodiments, the processor 1901, the memory 1902, and the peripheral interface 1903 are integrated on the same chip or the same circuit board. In some other embodiments, any or both of the processor 1901, the memory 1902, and the peripheral interface 1903 may be implemented on an independent chip or circuit board. This is not limited in this embodiment of this disclosure.

The RF circuit 1904 is configured to receive and transmit an RF signal, also referred to as an electromagnetic signal. The RF circuit 1904 communicates with a communication network and another communication device by using the electromagnetic signal. The RF circuit 1904 converts an electric signal into an electromagnetic signal for transmission, or converts a received electromagnetic signal into an electric signal. In an embodiment, the RF circuit 1904 includes: an antenna system, an RF transceiver, one or more amplifiers, a tuner, an oscillator, a digital signal processor, a codec chipset, a user identity module card, and the like. The radio frequency circuit 1904 may communicate with other terminals through at least one wireless communication protocol. The wireless communication protocol includes but is not limited to a world wide web, a metropolitan area network, an intranet, generations of mobile communication networks (2G, 3G, 4G, and 5G), a wireless local area network, and/or a wireless fidelity (Wi-Fi) network. In some embodiments, the radio frequency circuit 1904 may also include a circuit related to near field communication (NFC), which is not limited in this disclosure.

The display screen 1905 is configured to display a user interface (User Interface, UI). The UI may include a graph, a text, an icon, a video, and any combination thereof. When the display screen 1905 is a touch display screen, the display screen 1905 also has the ability to collect a touch signal at or foregoing the surface of the display screen 1905. The touch signal may be inputted, as a control signal, to the processor 1901 for processing. In this case, the display screen 1905 may also be configured to provide virtual buttons and/or virtual keyboards, also referred to as soft buttons and/or soft keyboards. In some embodiments, there may be one display screen 1905 disposed on a front panel of the terminal 1900. In some other embodiments, there may be two display screens 1905 respectively arranged on different surfaces of the terminal 1900 or in a folded design. In still other embodiments, the display screen 1905 may be a flexible display screen, disposed on a curved surface or a folded surface of the terminal 1900. Even further, the display screen 1905 may be arranged in a non-rectangular irregular pattern, that is, a special-shaped screen. The display screen 1905 may be made of materials such as liquid crystal display (LCD) and organic light-emitting diode (OLED).

The camera assembly 1906 is configured to capture images or videos. In an embodiment, the camera assembly 1906 includes a front-facing camera and a rear-facing camera. Generally, the front-facing camera is disposed on the front panel of the terminal 1900, and the rear-facing camera is disposed on a back surface of the terminal. In some embodiments, there are at least two rear-facing cameras, each being any one of a main camera, a depth-of-field camera, a wide-angle camera, and a telephoto camera, to achieve a background blurring function through fusion of the main camera and the depth-of-field camera, panoramic photo shooting and virtual reality (VR) shooting functions through fusion of the main camera and the wide-angle camera, or another fusion shooting function. In some embodiments, the camera assembly 1906 may further include a flash. The flash may be a single color temperature flash or a double color temperature flash. The double color temperature flash refers to a combination of a warm light flash and a cold light flash, and may be used for light compensation under different color temperatures.

The audio frequency circuit 1907 may include a microphone and a speaker. The microphone is configured to collect sound waves from a user and an environment and convert the sound waves into electrical signals that are inputted to the processor 1901 for processing or to the radio frequency circuit 1904 for voice communication. For purposes of stereo collection or noise reduction, there may be a plurality of microphones, which are respectively arranged at different parts of the terminal 1900. The microphone may be alternatively a microphone array or an omnidirectional acquisition microphone. The speaker is configured to convert the electrical signals from the processor 1901 or the radio frequency circuit 1904 into sound waves. The speaker may be a conventional thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio frequency circuit 1907 may further include an earphone jack.

The power supply 1908 is configured to supply power to components in the terminal 1900. The power supply 1908 may be an alternating current, a direct current, a disposable battery, or a rechargeable battery. When the power supply 1908 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may further be configured to support a quick charge technology.

In some embodiments, the terminal 1900 further includes one or more sensors 1909. The one or more sensors 1909 include but are not limited to: an acceleration sensor 1911, a gyro sensor 1912, a pressure sensor 1913, an optical sensor 1914, and a proximity sensor 1915.

The acceleration sensor 1911 may detect the magnitude of acceleration on three coordinate axes of a coordinate system established with the terminal 1900. For example, the acceleration sensor 1911 may be configured to detect the components of gravitational acceleration on three coordinate axes. The processor 1901 may control, according to a gravity acceleration signal acquired by the acceleration sensor 1911, the touch display screen 1905 to display the user interface in a transverse view or a longitudinal view. The acceleration sensor 1911 may also be configured to collect game or user motion data.

The gyroscope sensor 1912 may detect a body direction and a rotation angle of the terminal 1900, and the gyroscope sensor 1912 may collect a 3D motion of the terminal 1900 by a user in cooperation with the acceleration sensor 1911. The processor 1901 may implement the following functions according to the data collected by the gyro sensor 1912: motion sensing (for example, change of the UI based on a tilt operation of the user), image stabilization during photographing, game control, and inertial navigation.

The pressure sensor 1913 may be disposed on a side frame of the terminal 1900 and/or a lower layer of the display screen 1905. When the pressure sensor 1913 is arranged on the side frame of the terminal 1900, a grip signal of the user to the terminal 1900 may be detected, and the processor 1901 performs left and right hand recognition or a quick operation according to the grip signal collected by the pressure sensor 1913. In a case that the pressure sensor 1913 is disposed on the low layer of the touch display screen 1905, the processor 1901 controls, according to a pressure operation of the user on the touch display screen 1905, an operable control on the UI. The operable control includes at least one of a button control, a scroll-bar control, an icon control, and a menu control.

The optical sensor 1914 is configured to collect ambient light intensity. In an embodiment, the processor 1901 may control the display brightness of the touch display screen 1905 according to the ambient light intensity acquired by the optical sensor 1914. Specifically, in a case that the ambient light intensity is relatively high, the display luminance of the touch display screen 1905 is increased, and in a case that the ambient light intensity is relatively low, the display brightness of the touch display screen 1905 is reduced. In an embodiment, the processor 1901 may also dynamically adjust camera parameters of the camera assembly 1906 according to the ambient light intensity collected by the optical sensor 1914.

The proximity sensor 1915, also referred to as a distance sensor, is generally disposed on the front panel of the terminal 1900. The proximity sensor 1915 is configured to collect a distance between the user and a front surface of the terminal 1900. In an embodiment, when the proximity sensor 1915 detects that the distance between the user and the front surface of the terminal 1900 gradually becomes small, the touch display screen 1901 is controlled by the processor 1905 to switch and display from a screen-on state to a screen-off state. When the proximity sensor 1915 detects that the distance between the user and the front surface of the terminal 1900 gradually increases, the touch display screen 1901 is controlled by the processor 1905 to switch and display from the screen-off state to the screen-on state.

A person skilled in the art can understand that the structure shown in FIG. 19 does not constitute a limitation to the terminal 1900, and the terminal may include more or fewer components than those shown in the figure, or some components may be combined, or a different component arrangement may be used.

An embodiment of this disclosure further provides a computer-readable storage medium, storing at least one program code, the at least one program code, when being loaded and executed by the processor of the computer device, implementing the method for controlling a virtual character provided in the foregoing method embodiments.

This disclosure further provides a computer program product or a computer program. The computer program product or the computer program includes computer instructions, and the computer instructions are stored in a computer-readable storage medium. A processor of a computer device reads the computer instructions from the computer-readable storage medium. The processor executes the computer instructions, so that the computer device performs the method for controlling a virtual character in the foregoing various method embodiments.

What is claimed is:

1. A method for controlling a virtual character, the method being performed by at least one processor, and the method comprising:

displaying a first virtual character and a first control group, the first control group comprising a first-type control;

controlling an activity of the first virtual character in a virtual environment;

switching the first control group to a second control group in a first form based on the activity of the first virtual character meeting a first condition, the second control group comprising a user interface element and a second-type control, wherein the first-type control is a control via which the first virtual character is triggered to release a skill, the second-type control is a control via which the first virtual character is triggered to perform a non-combat behavior;

adding the second-type control to the second control group in response to an addition operation, the second-type control comprising a first second-type control in a display state and another second-type control in a display hidden state; and in response to receiving interaction information of interaction with the user interface element, switching the second control group in the first form to the second control group in a second form, the second control group in the second form comprising the first second-type control being switched from the display state to the display hidden state and the another second-type control being switch from the display hidden state to the display state.

2. The method according to claim 1, wherein the switching of the first control group to the second control group comprises:

switching the first control group to the second control group based on the activity of the first virtual character not requiring releasing of the skill.

3. The method according to claim 2, wherein the switching of the first control group to the second control group comprises at least one of:

switching the first control group to the second control group based on the first virtual character being located in a non-combat region;

switching the first control group to the second control group based on a duration for which the first virtual character leaves a combat region reaching a first duration; or switching the first control group to the second control group based on an idle duration of the first control group reaching a second duration.

4. The method according claim 3, further comprising:

switching the second control group to the first control group based on the activity of the first virtual character meeting a second condition.

5. The method according to claim 4, wherein the switching the second control group to the first control group comprises at least one of:

switching the second control group to the first control group based on the first virtual character being located in the combat region;

switching the second control group to the first control group based on the first virtual character being under attack;

switching the second control group to the first control group based on the duration for which the first virtual character leaves the non-combat region reaching a third duration;

switching the second control group to the first control group based on an idle duration of the second control group reaching a fourth duration; or switching the second control group to the first control group based on the non-combat behavior comprising the behavior of interacting with a target object, and a distance between the first virtual character and the target object being greater than a threshold.

6. The method according to claim 1, wherein the switching of the first control group to the second control group comprises:

switching the first control group to the second control group based on the activity of the first virtual character having an execution requirement of the non-combat behavior.

7. The method according to claim 6, wherein the switching of the first control group to the second control group comprises:

switching the first control group to the second control group based on the first virtual character being located in a release region of the non-combat behavior; or switching the first control group to the second control group based on the non-combat behavior comprising a behavior of interacting with a target object, and a distance between the first virtual character and the target object being less than a threshold.

8. The method according to claim 1, wherein the user interface element is a switching button, wherein the switching of the first control group to the second control group comprises:

displaying the switching button, the switching button being configured to switch between the first second-type control and the another second-type control; and wherein the switching of the second control group in the first form to the second control group in the second form comprises:

switching from the first second-type control to the another second-type control in response to a switching operation on the switching button.

9. The method according to claim 1, wherein the second-type control in the second control group comprises a summon control for summoning a target object, and the method further comprises:

controlling the first virtual character to summon the target object in the virtual environment in response to a summon operation on the summon control; and switching the first second-type control and the another second-type control, the another second-type control being configured to trigger a behavior of the first virtual character interacting with the target object.

10. The method according to claim 1, wherein the user interface element a wheel button, wherein the first second-type control in the display state is arranged along a peripheral contour of the wheel button, and wherein the switching of from the second control group in the first form to the second control group in a second form comprises:

switching the first second-type control from the display state to the display hidden state, and switching the another second-type control from the display hidden state to the display state in response to an operation of sliding along the peripheral contour of the wheel button.

11. The method according to claim 1, wherein the second control group further comprises: a blank control; and the adding comprises:

displaying at least one candidate control and a save control in response to a trigger operation on the blank control;

determining a selected candidate control as a target control in response to a selection operation on the at least one candidate control; and adding the target control to the second-type control in response to a save operation on the save control.

12. The method according to claim 1, wherein the second-type control comprises a state trigger control; and the method further comprises:

controlling the first virtual character to enter a target non-combat behavior state in response to a trigger operation on the state trigger control, and switching the state trigger control to a state controlling control; and controlling the first virtual character in the target non-combat behavior state to perform a target activity in response to a trigger operation on the state controlling control.

13. The method according to claim 1, further comprising:

adding a shooting button to the second control group in response to a trigger operation on a state trigger control; and shooting the activity of the first virtual character in the virtual environment in response to a trigger operation on the shooting button.

14. The method according to claim 1, further comprising:

adding a control hidden button to the second control group in response to a trigger operation on a state trigger control; and hiding all or some controls in response to a trigger operation on the control hidden button.

15. An apparatus for controlling a virtual character, the apparatus comprising:

at least one memory configured to store computer program code;

at least one processor configured to access the computer program code and operate as instructed by the computer program code, the computer program code including:

first switching code configured to cause the at least one processor to switch a first control group to a second control group in a first form based on an activity of the first virtual character meeting a first condition, the first control group comprising a first-type control and second control group comprising a second-type control, the second control group comprising a user interface element and a second-type control, wherein the first-type control is a control via which the first virtual character is triggered to release a skill, the second-type control is a control via which the first virtual character is triggered to perform a non-combat behavior, adding code configured to cause the at least one processor to add the second-type control to the second control group in response to an addition operation, the second-type control comprising a first second-type control in a display state and another second-type control in a display hidden state, and second switching code configured to cause the at least one processor to switch the second control group in the first form to the second control group in a second form in response to receiving interaction information of interaction with the user interface element, the second control group in the second form comprising the first second-type control being switched from the display state to the display hidden state and the another second-type control being switch from the display hidden state to the display state.

16. A non-transitory computer-readable medium storing instructions, the instructions comprising: one or more instructions that, when executed by one or more processors of a device for controlling a virtual character, cause the one or more processors to:

display a first virtual character and a first control group, the first control group comprising a first-type control;

control an activity of the first virtual character in a virtual environment;

switch the first control group to a second control group in a first form based on the activity of the first virtual character meeting a first condition, the second control group comprising a user interface element and a second-type control, wherein the first-type control is a control via which the first virtual character is triggered to release a skill, the second-type control is a control via which the first virtual character is triggered to perform a non-combat behavior;

add the second-type control to the second control group in response to an addition operation, the second-type control comprising a first second-type control in a display state and another second-type control in a display hidden state; and in response to receiving interaction information of interaction with the user interface element, switch the second control group in the first form to the second control group in a second form, the second control group in the second form comprising the first second-type control being switched from the display state to the display hidden state and the another second-type control being switch from the display hidden state to the display state.

17. The non-transitory computer-readable medium of claim 16, wherein switching of the first control group comprises:

switching the first control group to the second control group based on the activity of the first virtual character not requiring releasing of the skill.

\* \* \* \* \*